(12) United States Patent
Shin et al.

(10) Patent No.: US 11,310,007 B2
(45) Date of Patent: Apr. 19, 2022

(54) METHOD AND APPARATUS FOR CONFIGURING PARAMETERS IN VEHICLE-TO-EVERYTHING SYSTEM

(71) Applicant: Samsung Electronics Co., Ltd., Suwon-si (KR)

(72) Inventors: Cheolkyu Shin, Suwon-si (KR); Hyunseok Ryu, Suwon-si (KR); Jeongho Yeo, Suwon-si (KR); Jinyoung Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 31 days.

(21) Appl. No.: 16/683,395

(22) Filed: Nov. 14, 2019

(65) Prior Publication Data

US 2020/0153574 A1 May 14, 2020

(30) Foreign Application Priority Data

Nov. 14, 2018 (KR) .................. 10-2018-0140261
Nov. 12, 2019 (KR) .................. 10-2019-0144119

(51) Int. Cl.
*H04L 5/00* (2006.01)
*H04W 4/40* (2018.01)
*H04W 72/12* (2009.01)
*H04W 92/18* (2009.01)

(52) U.S. Cl.
CPC .......... *H04L 5/0044* (2013.01); *H04L 5/0007* (2013.01); *H04W 4/40* (2018.02); *H04W 72/1263* (2013.01); *H04W 92/18* (2013.01)

(58) Field of Classification Search
CPC ................. H04L 5/0044; H04L 5/0007; H04L 27/26025; H04L 27/261; H04L 27/2655; H04W 4/40; H04W 72/1263; H04W 92/18; H04W 84/005; H04W 72/02; H04W 72/0406
See application file for complete search history.

(56) References Cited

U.S. PATENT DOCUMENTS

2020/0235887 A1* 7/2020 Hou ...................... H04L 5/0091
2021/0152272 A1* 5/2021 Kimura ............... H04L 27/2666

OTHER PUBLICATIONS

CN-201711433214.8, Certified Copy of Foreign Priority Document of Application No. 16648243, Dec. 26, 2017 (Year: 2017).*
CN109963265A, English translation of priority document publication (Year: 2019).*

(Continued)

*Primary Examiner* — Sharmin Chowdhury
(74) *Attorney, Agent, or Firm* — Jefferson IP Law, LLP

(57) ABSTRACT

The disclosure relates to a communication method and system for converging a 5th-Generation (5G) communication system for supporting higher data rates beyond a 4th-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. A method and apparatus for configuring parameters required for a terminal in a vehicle-to-everything (V2X) system to exchange information with another vehicle terminal or pedestrian terminal via a sidelink are provided.

20 Claims, 15 Drawing Sheets

(56) References Cited

OTHER PUBLICATIONS

ETRI: "Sidelink Design for NR V2X", 3GPP Draft; R1-1809498 Sidelink Design for NR V2X (VF), 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 20, 2018-Aug. 24, 2018, Aug. 17, 2018, XP051516861.
CATT: "Discussion on physical layer structure in NR V2X", 3GPP Draft; R1-1812617, 3rd Generation Partnership Project (3GPP), Mobile Competence Centre ; 650, Route Des Lucioles ; F-06921 Sophia-Antipolis Cedex ; France, vol. RAN WG1, No. Spokane, USA; Nov. 12, 2018-Nov. 16, 2018 Nov. 11, 2018, XP051554573.
OPPO: "Physical layer structure for NR-V2X", 3GPP Draft; R1-1812810 PHY Layer Structure, 3rd Generation Partnership Project (3GPP), Mobile Competence Centre; 650, Route Des Lucioles; F-06921 Sophia-Antipolis Cedex; France, vol. RAN WG1, No. Spokane, USA; Nov. 12, 2018-Nov. 16, 20186, Nov. 11, 2018, XP051554770.
Extended European Search Report dated Mar. 19, 2020, issued in European Application No. 19209190.8.
European Office Action dated Apr. 15, 2021, issued in a counterpart European Application No. 19 209 190.8-1215.
OPPO: "Discussion of Uu-based sidelink resource allocation and configuration", 3GPP Draft; R1-1812813, UU#U00A0TO#U00A0Control#U00A0Sl, 3rd Generation Partnership Project (3GPP), Mobile Competence Centre ; 650, Route Des Lucioles ; F-06921 Sophia-Antipolis Cedex ; France, vol. RAN WG1, No. XP051554773; Nov. 11, 2018, Spokane, USA.

\* cited by examiner

METHOD AND APPARATUS FOR CONFIGURING PARAMETERS IN VEHICLE-TO-EVERYTHING SYSTEM

CROSS-REFERENCE TO RELATED APPLICATION(S)

This application is based on and claims priority under 35 U.S.C. § 119(a) of a Korean patent application number 10-2018-0140261, filed on Nov. 14, 2018, in the Korean Intellectual Property Office, and of a Korean patent application number 10-2019-0144119, filed on Nov. 12, 2019, in the Korean Intellectual Property Office, the disclosure of each of which is incorporated by reference herein in its entirety.

BACKGROUND

1. Field

The disclosure relates to a mobile communication system. More particularly, the disclosure relates to a method and apparatus for configuring parameters required for a terminal supporting vehicle-to-everything (V2X) communication to exchange information with another vehicle terminal or pedestrian terminal via sidelinks.

2. Description of Related Art

To meet the demand for wireless data traffic having increased since deployment of 4th-Generation (4G) communication systems, efforts have been made to develop an improved 5th-Generation (5G) or pre-5G communication system. Therefore, the 5G or pre-5G communication system is also called a 'Beyond 4G Network' or a 'Post Long Term Evolution (LTE) System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid Frequency-shift keying (FSK) and Quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, with recent advances in the V2X system, various studies have been conducted on the communication between a terminal supporting V2X and another vehicle terminal or pedestrian terminal.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a wireless communication system and is to provide a method and apparatus that can configure parameters needed by a terminal supporting V2X to exchange information with another vehicle terminal or pedestrian terminal via sidelink communication. More specifically, the disclosure relates to a method for configuring the base station and the terminal and operating the terminal for sidelink transmission and reception.

Additional aspects will be set forth in part in the description which follows and, in part, will be apparent from the description, or may be learned by practice of the presented embodiments.

In accordance with an aspect of the disclosure, a method of vehicle-to-everything (V2X) communication for a first terminal is provided. The method includes determining at least one parameter related to the numerology of a sidelink signal to be transmitted to a second terminal, and transmitting the sidelink signal to the second terminal based on the at least one parameter.

In accordance with another aspect of the disclosure, a first terminal configured to perform V2X communication is provided. The first terminal includes a transceiver configured to transmit and receive a signal, and at least one processor configured to determine at least one parameter related to the numerology of a sidelink signal to be transmitted to a second terminal, and transmit the sidelink signal to the second terminal based on the at least one parameter.

In accordance with another aspect of the disclosure, a method of V2X communication for a second terminal is provided. The method includes determining at least one parameter related to the numerology of a sidelink signal to be received from a first terminal, and receiving the sidelink signal from the first terminal based on the at least one parameter.

In accordance with another aspect of the disclosure a second terminal configured to perform V2X communication is provided. The second terminal includes a transceiver configured to transmit and receive a signal, and at least one processor configured to determine at least one parameter related to the numerology of a sidelink signal to be received from a first terminal, and receive the sidelink signal from the first terminal based on the at least one parameter.

The disclosure proposes a parameter configuration method for a terminal supporting V2X. This method enables flexible parameter settings such as various numerology options to thereby improve the reliability of the signal received through the sidelink.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
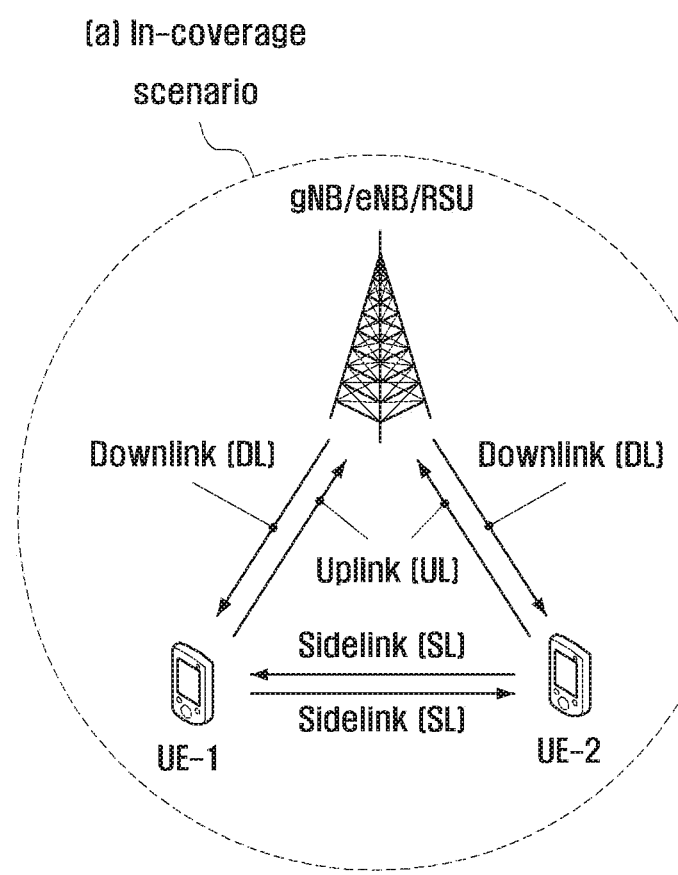
FIGS. 1A, 1B, 1C and 1D illustrate a communication system according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the drawings, some elements are exaggerated, omitted, or only outlined in brief, and thus may be not drawn to scale. The same or similar reference symbols are used throughout the drawings to refer to the same or like parts.

The aspects, features, and advantages of certain embodiments of the disclosure will be more apparent from the following detailed description taken in conjunction with the accompanying drawings. The description of the various embodiments is to be construed as illustrative only and does not describe every possible instance of the disclosure. It should be apparent to those skilled in the art that the following description of various embodiments of the disclosure is provided for illustrative purposes only and not for the purpose of limiting the disclosure as defined by the appended claims and their equivalents. The same reference symbols are used throughout the description to refer to the same parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out operations of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module", or the like may refer to a software component or hardware component such as a field-programmable gate array (FPGA) or application-specific integrated circuit (ASIC) capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays, or variables. A function provided by a component and unit may be a combination of smaller components and units, and it may be combined with others to compose large components and units. Components and units may be configured to drive a device or one or more processors in a secure multimedia card.

The following description of embodiments of the disclosure is focused on the wireless access network named New Radio (NR) and the core network named Packet Core (5G system, 5G core network, or next generation core (NG core)) in the 5G mobile communication standard specified by the 3GPP (3rd generation partnership project) being a standardization organization for mobile communication. However, it should be understood by those skilled in the art that the subject matter of the disclosure is applicable to other communication systems having similar technical backgrounds without significant modifications departing from the scope of the disclosure.

In the 5G system, to support network automation, the network data analytics function (NWDAF) may be defined as a network function that analyzes data collected from the 5G network and provides an analysis result. The NWDAF can collect, store and analyze information from the 5G network and provide the analysis results to specific network functions (NFs), and the analysis results can be used independently in each NF.

For ease of description, some of the terms and names defined in the 3GPP standards (standards for 5G, NR, LTE, or similar systems) may be used in the following description. However, the disclosure is not limited by these terms and names, and may also be applied to systems conforming to other standards.

In the following description, various terms may be used for identifying access nodes, referring to network entities, referring to messages, referring to interfaces between network entities, and referring to various identification information. These terms are illustrated for convenience of description. Thus, the disclosure is not limited by the terms used, and different terms referring to objects having identical technical meanings may be used.

To meet the increasing demand for wireless data traffic since the commercialization of 4G communications systems, efforts are being made to develop improved 5G communication systems (NR). In the 5G communication system, unlike LTE, various subcarrier spacings (SCS) including 15 kHz, 30 kHz, 60 kHz, and 120 kHz are supported, polar coding is applied to the physical control channel, and low density parity check (LDPC) is applied to the physical data channel. Additionally, in the 5G communication system, not only discrete Fourier transform spread orthogonal frequency division multiplexing (DFT-s-OFDM) but also cyclic prefix OFDM (CP-OFDM) are used as a waveform for uplink transmission. While LTE supports HARQ (Hybrid ARQ) retransmission in units of transport blocks (TBs), the 5G communication system can additionally support HARQ retransmission based on a code block group (CBG) composed of multiple code blocks (CBs).

A communication system may provide various services to users. To provide various services to users, a method and apparatus are required that can provide services within the same time period according to the characteristics of individual services. Various services to be provided in the 5G communication system are being studied, and one of them is a service that satisfies low latency and high reliability requirements.

In the case of vehicle communication, the standardization of LTE-based V2X has been completed in 3GPP Rel-14 and Rel-15 based on the device-to-device (D2D) communication structure. Recently, efforts have been made to develop 5G NR based V2X. NR V2X will support unicast communication between terminals, groupcast (or multicast) communication, and broadcast communication. In addition, unlike LTE V2X aiming to transmit and receive basic safety information required for the vehicle driving on the road, NR V2X aims to provide more advanced services such as platooning, advanced driving, extended sensors, and remote driving.

As described above, the NR system requires more flexible system operation than the existing 4G system. Specifically, in the link between the terminal and the base station of the NR system, various numerology options are supported, and parameter settings are possible for the subcarrier spacing (SCS). For example, in the case of the primary synchronization signal (PSS) or the secondary synchronization signal (SSS) transmitted or received at the initial connection stage, up to two different SCSs may be set according to frequency bands. In the case of the physical broadcast channel (PBCH), the same SCS as that of the PSS/SSS is set. In the case of the physical random access channel (PRACH), the SCS for msg1 is set through the system information block (SIB), the SCS for msg2 and msg4 is set through the master information block (MIB), and the SCS for msg3 may be set equal to the SCS of msg1 without a setting from the base station or may be set through the SIB. After the initial connection stage, the SCS is configured through the radio resource control (RRC). In the link between the terminal and the base station of the NR system, the SCS in the initial connection stage and the SCS for receiving control and data signals after the initial connection stage may be set differently.

Hence, when a NR V2X terminal supports various numerology options and communicates through a sidelink, it needs to know information about the SCS transmitted by a different terminal to receive a signal transmitted by the different terminal. Specifically, it may be considered that the SCS of the synchronization signal transmitted from the NR V2X terminal and the SCS of the control and data signals are set differently. If various SCSs are configured, the terminal may have to blindly detect the SCS in the process of synchronization with the base station and may also have to blindly detect the SCS for the synchronization signal transmitted by the terminal. In addition, if the SCSs of the synchronization signal and the control and data signals can be set differently, the NR V2X terminal may have difficulty in receiving a synchronization signal and control and data signals from a terminal configured with a different SCS.

In addition, CP-OFDM as well as DFT-s-OFDM is used as the waveform for uplink transmission between the terminal and the base station in the NR system. Hence, if plural waveforms are supported, when the NR V2X terminal communicates through the sidelink, it needs to know the waveform information transmitted by a different terminal to receive a signal transmitted from the different terminal. In addition, for the link between the terminal and the base station in the NR system, the configuration of the reference signal (RS) can be very flexible. For example, in the case of the demodulation reference signal (DMRS) for data reception, various patterns can be set through RRC. Hence, if flexible reference signal patterns are supported, when the NR V2X terminal communicates through the sidelink, it needs to know the information on the reference signal transmitted by a different terminal to receive a signal transmitted from the different terminal. To support these scenarios in NR V2X unlike existing LTE D2D or LTE V2X technology, there is a need for a parameter configuration method and apparatus that enable a NR V2X vehicle terminal to exchange a synchronization signal, a control signal, and a data signal via a sidelink with another vehicle or pedestrian terminal.

FIGS. 1A, 1B, 1C and 1D illustrate a communication system according to various embodiments of the disclosure.

Referring to FIG. 1A, a case where all V2X terminals (UE-1 and UE-2) are located within the coverage of the base station (i.e. in-coverage) is depicted.

In the in-coverage scenario, all V2X terminals may receive data and control information from the base station in the downlink (DL) or may transmit data and control information to the base station in the uplink (UL). Here, the data and control information may be data and control information for V2X communication, or may be data and control information for regular cellular communication. In addition, V2X terminals may transmit and receive data and control information for V2X communication through the sidelink (SL).

Figure 1B:
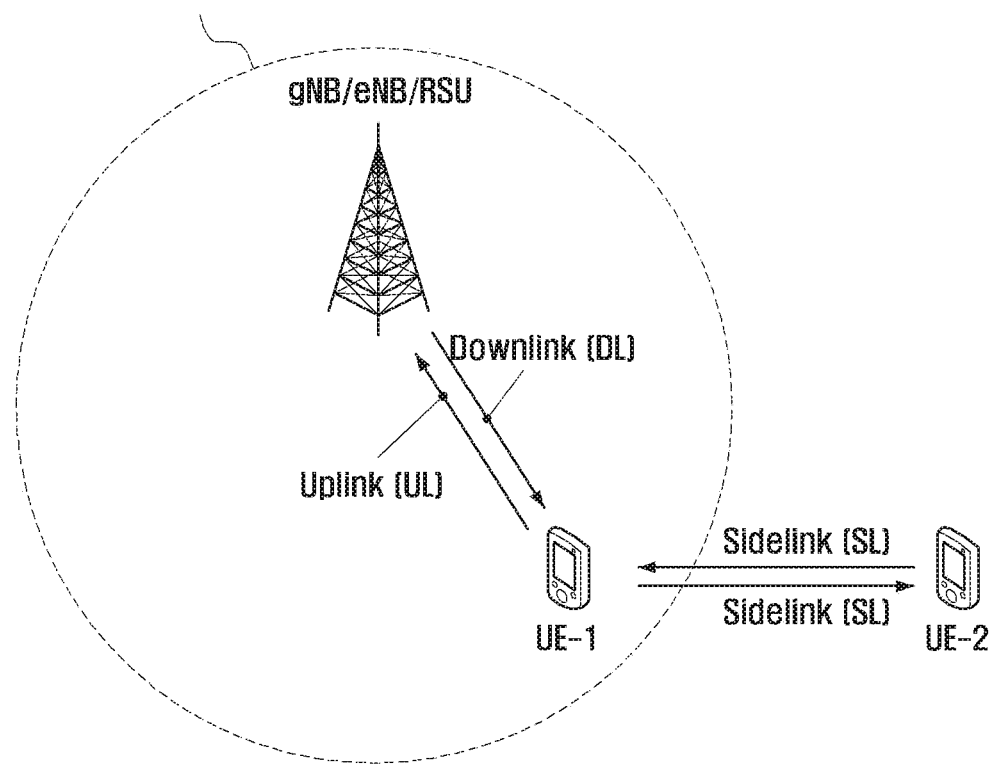

Referring to FIG. 1B, a case where UE-1 among V2X terminals is located within the coverage of the base station and UE-2 is located outside the coverage of the base station is depicted. The case of FIG. 1B may be referred to as a partial-coverage scenario.

In the partial-coverage scenario, UE-1 located within the coverage of the base station may receive data and control information from the base station in the downlink, or transmit data and control information to the base station in the uplink.

UE-2 located outside the coverage of the base station cannot receive data or control information from the base station in the downlink, or cannot transmit data or control information to the base station in the uplink.

UE-2 and UE-1 may transmit and receive data and control information for V2X communication through the sidelink.

Figure 1C:
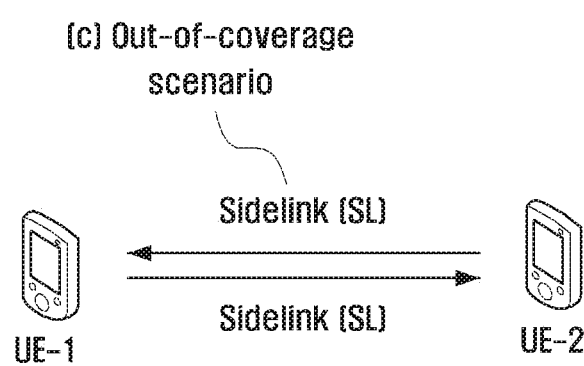

Referring to FIG. 1C, a case where all V2X terminals (UE-1 and UE-2) are located outside the coverage of the base station (i.e. out-of-coverage) is depicted.

In the out-of-coverage scenario, UE-1 and UE-2 cannot receive data or control information from the base station in the downlink, or cannot transmit data or control information to the base station in the uplink.

UE-2 and UE-1 may transmit and receive data and control information for V2X communication through the sidelink.

Figure 1D:
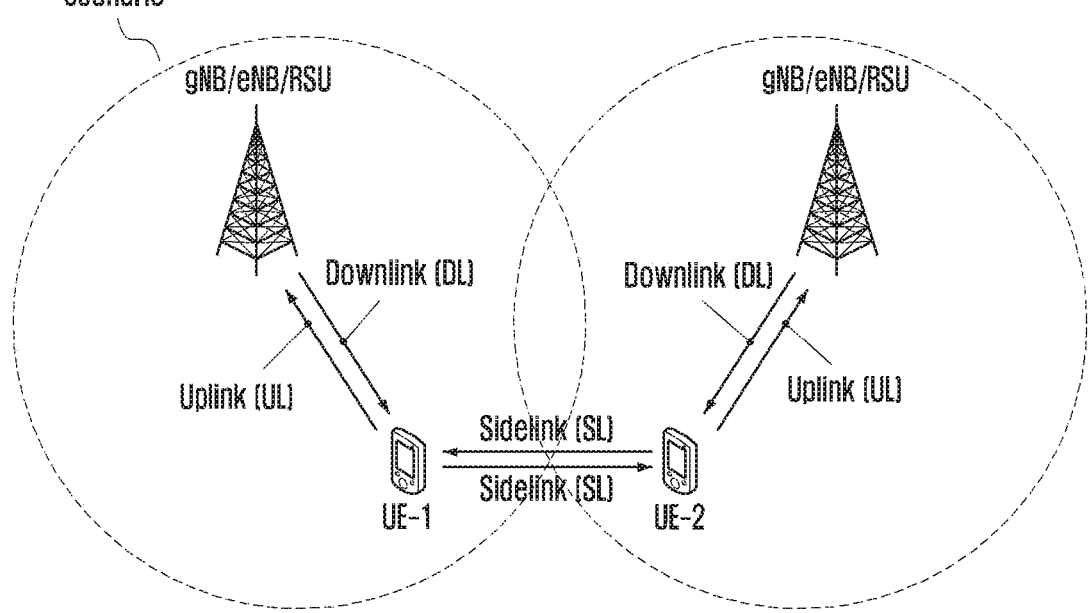

Referring to FIG. 1D, a case where terminals located in different cells perform V2X communication (i.e., inter-cell V2X communication) is depicted. Specifically in FIG. 1D, the V2X TX terminal and the V2X RX terminal are connected to different base stations (RRC connected state) or are camping on different base stations (RRC idle state). Here, UE-1 may be a V2X TX terminal and UE-2 may be a V2X RX terminal. In reverse, UE-1 may be a V2X RX terminal and UE-2 may be a V2X TX terminal. UE-1 may receive a V2X-specific system information block (SIB) from a first base station to which it is connected (or is camping on), and UE-2 may receive a V2X-specific SIB from a second base station to which it is connected (or is camping on). Here, information of the V2X-specific SIB received by UE-1 and information of the V2X-specific SIB received by UE-2 may be different from each other. Accordingly, for V2X communication between terminals located in different cells, the information exchanged may be unified or the proposed method and apparatus supporting more flexible configuration of parameters may be applied.

Although FIGS. 1A, 1B, 1C and 1D illustrate a V2X system including two terminals (UE-1 and UE-2) for ease of description, the disclosure is not limited thereto. The uplink and the downlink between the base station and the V2X terminal may be referred to as the Uu interface, and the sidelink between V2X terminals may be referred to as the PC5 interface. Hence, in the following description, the corresponding terms can be used interchangeably.

In the description, the term "terminal" may refer to a vehicle that supports vehicle-to-vehicle (V2V) communication, a vehicle or pedestrian's handset (i.e., smartphone) that supports vehicle-to-pedestrian (V2P) communication, a vehicle that supports vehicle-to-network (V2N) communication, or a vehicle that supports vehicle-to-infrastructure (V2I) communication. The terminal may also refer to a road side unit (RSU) with a terminal functionality, an RSU with a base station functionality, or an RSU with some of a base station functionality and some of a terminal functionality.

In the description, the term "base station" may refer to a base station supporting both V2X communication and regular cellular communication, or a base station supporting only V2X communication. In this case, the base station may indicate a 5G base station (i.e., gNB), a 4G base station (i.e., eNB), or an RSU. Hence, unless otherwise specified, the base station and the RSU can be used for the same concept and can be used interchangeably in the description.

Figure 2:
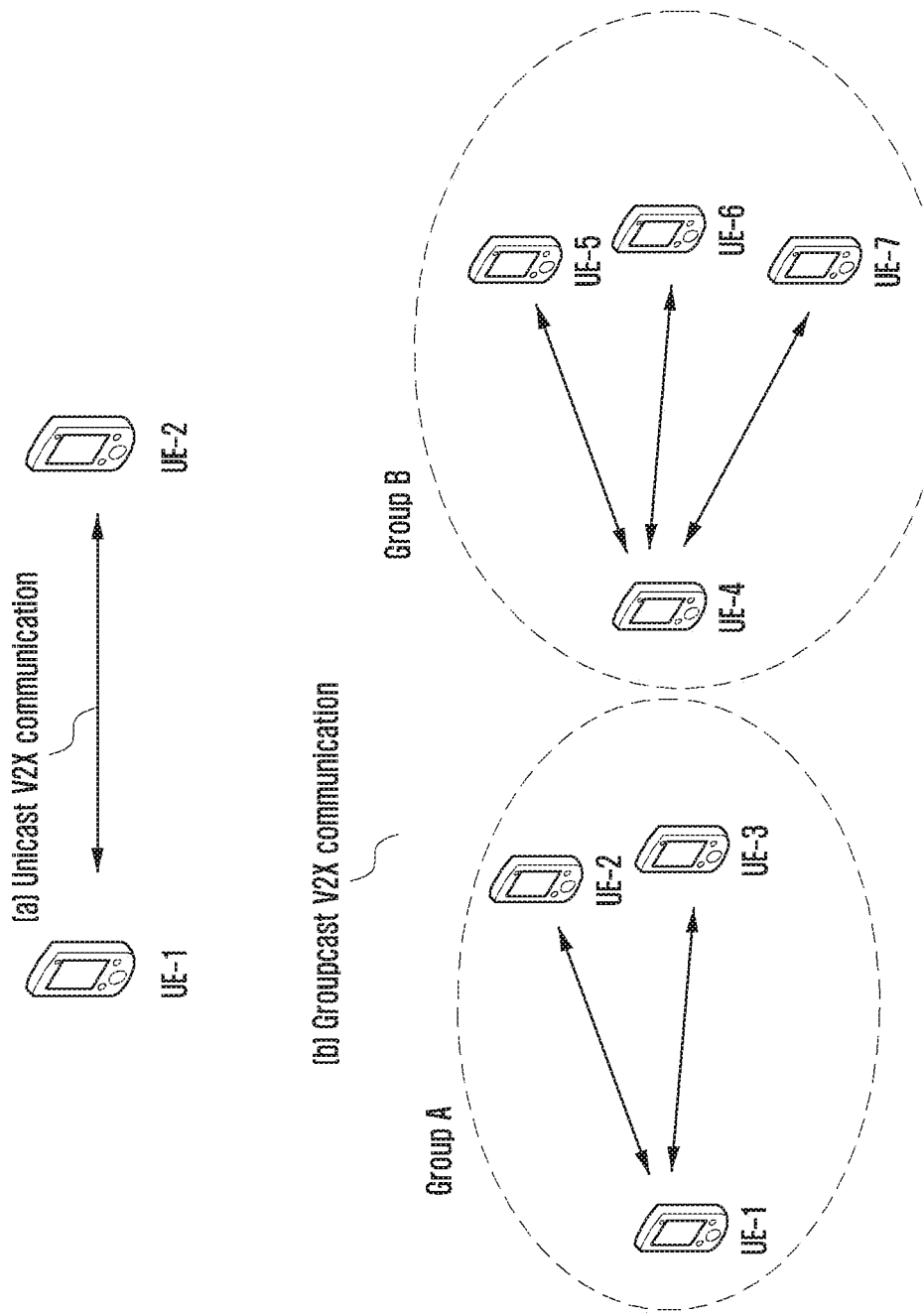
FIG. 2 illustrates an example of V2X communication over a sidelink according to an embodiment of the disclosure.

FIG. 2 illustrates an example of V2X communication over a sidelink according to an embodiment of the disclosure.

Referring to part (a) of FIG. 2, a transmitting terminal (TX terminal) and a receiving terminal (RX terminal) may communicate in a one-to-one manner, which may be referred to as unicast communication.

As shown in part (b) of FIG. 2, a TX terminal and RX terminals may communicate in a one-to-many manner, which may be referred to as groupcast or multicast communication.

In part (b) of FIG. 2, UE-1, UE-2 and UE-3 form a group (e.g., group A) to perform groupcast communication, and UE-4, UE-5, UE-6 and UE-7 form another group (e.g., group B) to perform groupcast communication. Each terminal performs groupcast communication only within the group to which it belongs, and there is no communication between different groups. Only two groups are formed in part (b) of FIG. 2, but the disclosure is not limited thereto.

Although not shown in FIG. 2, V2X terminals may perform broadcast communication. In broadcast communication, all V2X terminals can receive data and control information transmitted by a V2X TX terminal over the sidelink. For example, if UE-1 is the TX terminal for broadcast in part (b) of FIG. 2, all other terminals (UE-2, UE-3, UE-4, UE-5, UE-6 and UE-7) can receive data and control information transmitted by UE-1.

Unlike LTE V2X, NR V2X may consider to support a case where one vehicle terminal sends data to only one node through unicast and a case where one vehicle terminal sends data to multiple nodes through groupcast. For example, this unicast and groupcast technology may be useful for a service scenario, such as platooning being a technique that connects two or more vehicles via a network to drive them as a cluster. Specifically, the leader node of a group of nodes formed by platooning can perform unicast communication to control a specific node of the group, and can perform groupcast communication to simultaneously control multiple nodes of the group.

Figure 3:
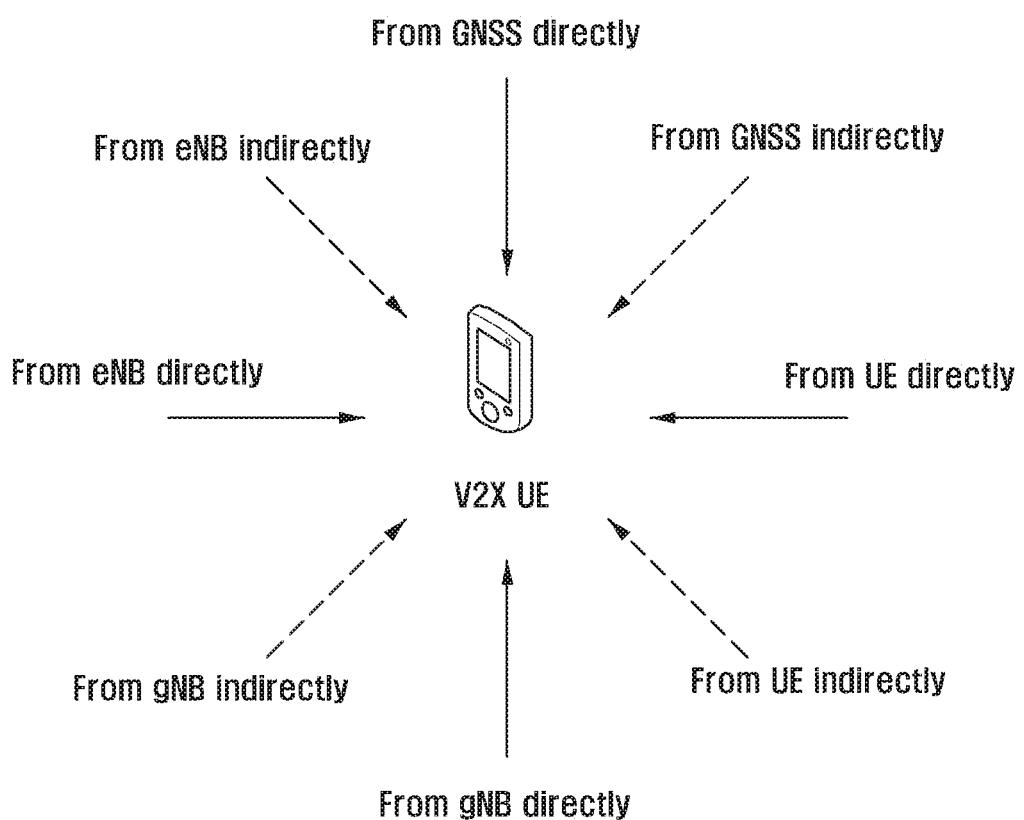
FIG. 3 illustrates types of synchronization signals that can be received by a V2X terminal according to an embodiment of the disclosure.

FIG. 3 illustrates types of synchronization signals that can be received by a V2X terminal according to an embodiment of the disclosure.

Referring to FIG. 3, the V2X terminal may receive a sidelink synchronization signal from various sidelink synchronization sources as follows.

The V2X terminal may receive a synchronization signal directly from a global navigation satellite system (GNSS) or a global positioning system (GPS).
In this case, the GNSS or GPS may be a sidelink synchronization source.

The V2X terminal may receive a synchronization signal indirectly from a GNSS or a GPS.
Receiving a synchronization signal indirectly from a GNSS may correspond to a case where V2X UE-A receives a sidelink synchronization signal (SLSS) transmitted by V2X UE-1 that is directly synchronized with the GNSS. Here, V2X UE-A may receive a synchronization signal from the GNSS in two hops. As another example, V2X UE-2, which is synchronized with the SLSS transmitted by V2X UE-1 synchronized with the GNSS, may transmit the SLSS. If V2X UE-A receives this SLSS, it indicates that a synchronization signal is received from the GNSS in three hops. Similarly, V2X UE-A may receive a synchronization signal from the GNSS in three or more hops.

In this case, another V2X terminal synchronized with the GNSS may be a sidelink synchronization source.

The V2X terminal may receive a synchronization signal directly from the LTE base station (eNB).
The V2X terminal may directly receive a primary synchronization signal (PSS) or secondary synchronization signal (SSS) transmitted by the LTE base station.
In this case, the eNB may be a sidelink synchronization source.

The V2X terminal may receive a synchronization signal indirectly from the LTE base station (eNB).
Receiving a synchronization signal indirectly from the eNB may correspond to a case where V2X UE-A receives a SLSS transmitted by V2X UE-1 that is directly synchronized with the eNB. Here, V2X UE-A may receive a synchronization signal from the eNB in two hops. As another example, V2X UE-2, which is synchronized with the SLSS transmitted by V2X UE-1 synchronized directly with the eNB, may transmit the SLSS. If V2X UE-A receives this SLSS, it indicates that a synchronization signal is received from the eNB in three hops. Similarly, V2X UE-A may receive a synchronization signal from the eNB in three or more hops.

In this case, another V2X terminal synchronized with the eNB may be a sidelink synchronization source.

The V2X terminal may receive a synchronization signal indirectly from the NR base station (gNB).
Receiving a synchronization signal indirectly from the gNB may correspond to a case where V2X UE-A receives a SLSS transmitted by V2X UE-1 that is directly synchronized with the gNB. Here, V2X UE-A may receive a synchronization signal from the gNB in two hops. As another example, V2X UE-2, which is synchronized with the SLSS transmitted by V2X UE-1 synchronized directly with the gNB, may transmit the SLSS. If V2X UE-A receives this SLSS, it indicates that a synchronization signal is received from the gNB in three hops. Similarly, V2X UE-A may receive a synchronization signal from the gNB in three or more hops.

In this case, another V2X terminal synchronized with the gNB may be a sidelink synchronization source.

The V2X terminal (V2X UE-A) may receive a synchronization signal directly from another V2X terminal (V2X UE-B).
If V2X UE-B fails to detect a SLSS transmitted from a synchronization source GNSS, gNB, eNB or another V2X terminal, V2X UE-B may transmit a SLSS based on its own timing. V2X UE-A may directly receive the SLSS transmitted by V2X UE-B.

In this case, another V2X terminal may be a sidelink synchronization source.

The V2X terminal (V2X UE-A) may receive a synchronization signal indirectly from another V2X terminal (V2X UE-B).
Receiving a synchronization signal indirectly from V2X UE-B may correspond to a case where V2X UE-A receives a SLSS transmitted by V2X UE-1 that is directly synchronized with V2X UE-B. Here, V2X UE-A may receive a synchronization signal from V2X UE-B in two hops. As another example, V2X UE-2, which is synchronized with the SLSS transmitted by V2X UE-1 synchronized directly with V2X UE-B, may transmit the SLSS. If V2X UE-A receives this SLSS, it indicates that a synchronization signal is received from V2X UE-B in three hops. Similarly, V2X UE-A may receive a synchronization signal from V2X UE-B in three or more hops.

In this case, another V2X terminal synchronized with one V2X terminal may be a sidelink synchronization source.

In the description, the sidelink synchronization signal may indicate a sidelink synchronization signal block (S-SSB). The S-SSB may include a sidelink synchronization signal (SLSS) including a sidelink primary synchronization signal (S-PSS) and a sidelink secondary synchronization signal (S-SSS), and a physical sidelink broadcast channel (PSBCH). Here, the S-PSS may include a Zadoff-Chu sequence or M-sequence, and the S-SSS may include an M-sequence or gold sequence. Similarly to the PSS/SSS in the cellular system, the sidelink ID may be transmitted through the S-PSS and S-SSS in combination or the S-SSS only. Like the physical broadcast channel (PBCH) in the cellular system, the PSBCH may transmit a master information block (MIB) for sidelink communication. In the description, unlike the sidelink synchronization signal block (S-SSB), the synchronization signal between the base station and the terminal is referred to as a synchronization signal block (SSB), which may be composed of the PSS/SSS and PBCH.

Figure 4:
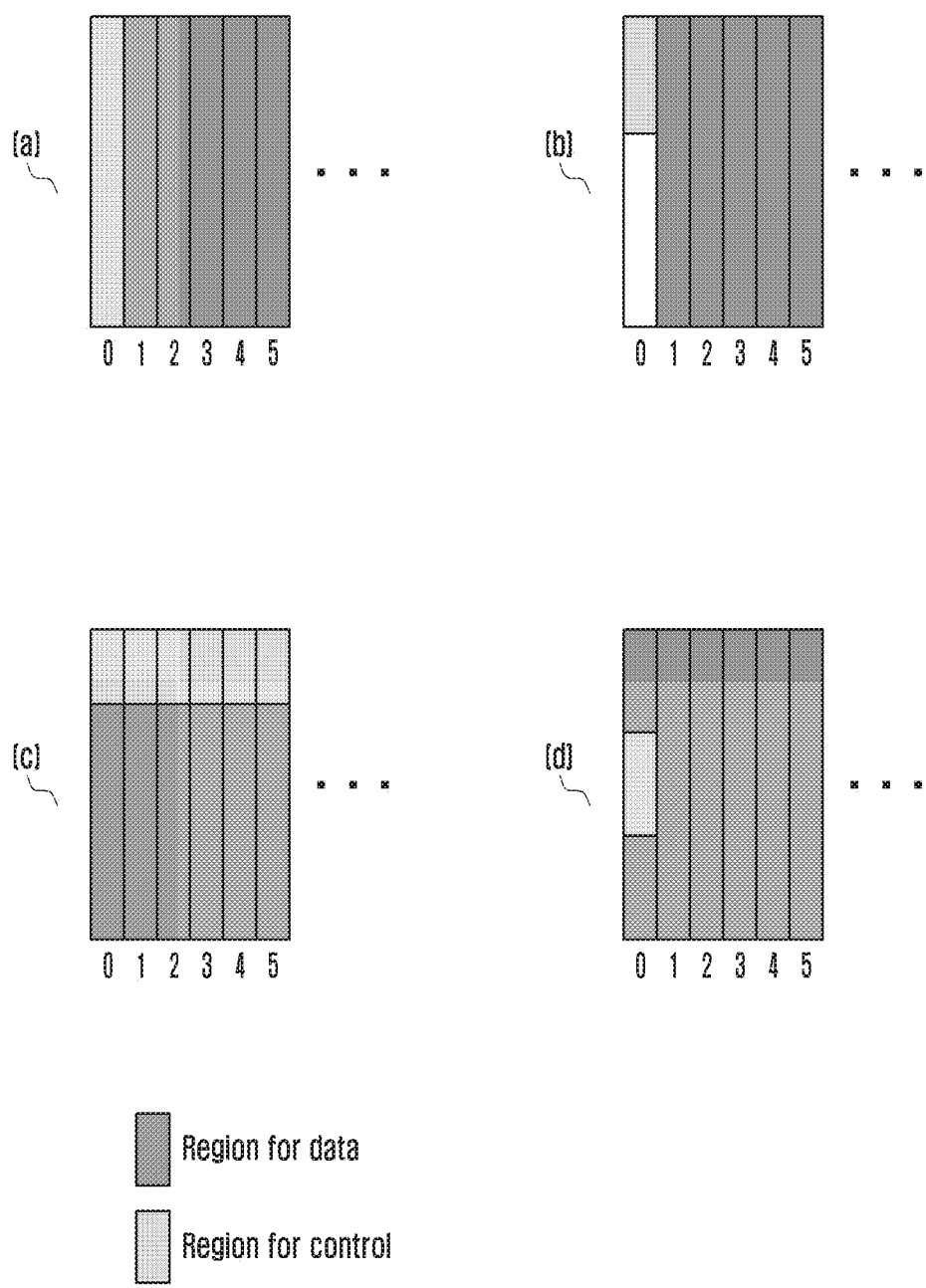
FIG. 4 illustrates examples of multiplexing control and data signals that can be received by a V2X terminal according to an embodiment of the disclosure.

FIG. 4 illustrates examples of multiplexing control and data signals that can be received by a V2X terminal according to an embodiment of the disclosure.

Referring to FIG. 4, in the case of NR V2X sidelinks, it is possible to consider both frequency domain multiplexing (FDM) and time domain multiplexing (TDM) of a data channel (physical sidelink shared channel (PSSCH)) and a control channel (physical sidelink control channel (PSCCH)). Parts (a), (b), (c) and (d) of FIG. 4 illustrate ways of multiplexing the PSSCH and the PSCCH. Each multiplexing option is described below.

Part (a) of FIG. 4: the control channel and associated data channel are transmitted over non-overlapping time domain resources, and the frequency domain resources used by the two channels are the same.

Part (b) of FIG. 4: the control channel and associated data channel are transmitted over non-overlapping time domain resources, and the frequency domain resources used by the two channels may be different.

Part (c) of FIG. 4: the control channel and associated data channel are transmitted over non-overlapping frequency domain resources and overlapping time domain resources, and the time domain resources used by the two channels are the same.

Part (d) of FIG. 4: a portion of the control channel and associated data channel are transmitted over overlapping time domain resources and non-overlapping frequency domain resources, but another associated data channel and another portion of the control channel are transmitted over non-overlapping time domain resources.

FIG. 4 depicts a case where the control channel occupies one symbol in time and the data channel occupies five symbols. However, in actual situations, the number of symbols over which the control channel or the data channel is transmitted may vary. Also, the NR V2X system may support one or more of the above options for multiplexing the PSSCH and the PSCCH.

In addition, the NR V2X system may support receiving a feedback signal from a physical sidelink feedback channel (PSFCH). Unlike the existing LTE V2X system, if the channel information is fed back through the PSFCH, the transmission efficiency can be improved by configuring and transmitting appropriate transmission parameters based on the feedback information in the channel environment where the feedback information is valid.

FIGS. 5A, 5B, 5C and 5D depict operations of the terminal in a procedure for receiving a synchronization signal block (SSB) from the base station, a procedure for receiving a sidelink synchronization signal block (S-SSB) from another terminal, a procedure for receiving a sidelink control signal (PSCCH) and a sidelink data signal (PSSCH), and a procedure for receiving a sidelink feedback signal (PSFCH) with reference to the different V2X scenarios described in FIGS. 1A, 1B, 1C and 1D according to various embodiments of the disclosure.

Figure 5A:
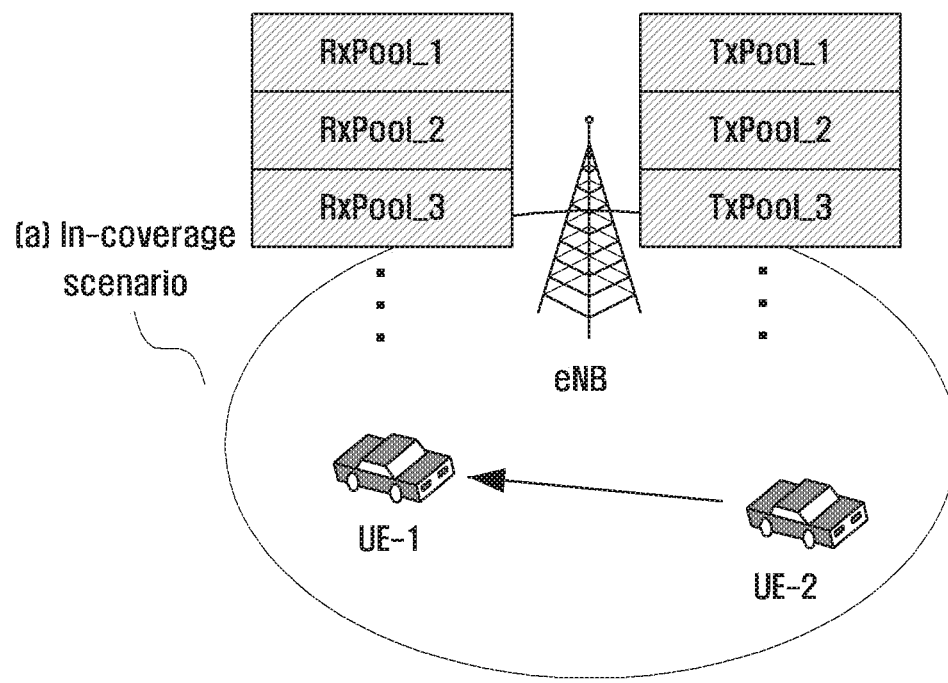
FIGS. 5A, 5B, 5C and 5D depict various V2X scenarios where the terminal obtains parameter configuration information from the base station and receives a signal according to various embodiments of the disclosure.

Referring to FIG. 5A, an in-coverage case where all V2X terminals (UE-1 and UE-2) are located within the coverage of the base station as described in FIG. 1A is illustrated. In this case, the V2X terminals may be synchronized with the SSB transmitted from the base station, and may be allocated a resource pool that can be used for sidelink communication through V2X-specific SIB information from the base station. The resource pool refers to time and frequency resources that are used by a vehicle terminal to exchange information with another vehicle terminal or a pedestrian mobile terminal using sidelinks in V2X. In FIG. 5A, the resource pool used by the terminal for transmission is represented by TxPool, and the resource pool used by the terminal for reception is represented by RxPool. For reference, in FIG. 5A, the resource pools are represented with respect to a case where UE-1 receives the PSCCH and PSSCH from UE-2. In FIG. 5A, as the V2X terminals within the coverage of the base station are synchronized with the base station, UE-1 and UE-2 may transmit and receive the PSCCH and the PSSCH over the sidelink without an additional synchronization operation. However, in FIG. 5A, if V2X terminals are configured with different parameter information for PSCCH and PSSCH transmission or for PSFCH transmission, UE-1 should obtain configuration information thereabout before receiving the PSCCH and PSSCH from UE-2. Similarly, before receiving the PSCCH and PSSCH from UE-1, UE-2 should obtain configuration information thereabout. In addition, when a terminal having received the PSCCH and the PSSCH feeds back channel information through the PSFCH, the terminal wishing to receive the feedback information should obtain configuration information about the PSFCH. Here, the parameter information for PSCCH or PSSCH reception may include information regarding the subcarrier spacing (SCS), CP length, waveform, reference signal scrambling ID, and DMRS or CSI-RS (channel state information reference signal) patterns for the PSCCH and the PSSCH. The parameter information for PSFCH reception may include information regarding the subcarrier spacing, CP length, and waveform for the PSFCH.

Figure 5B:
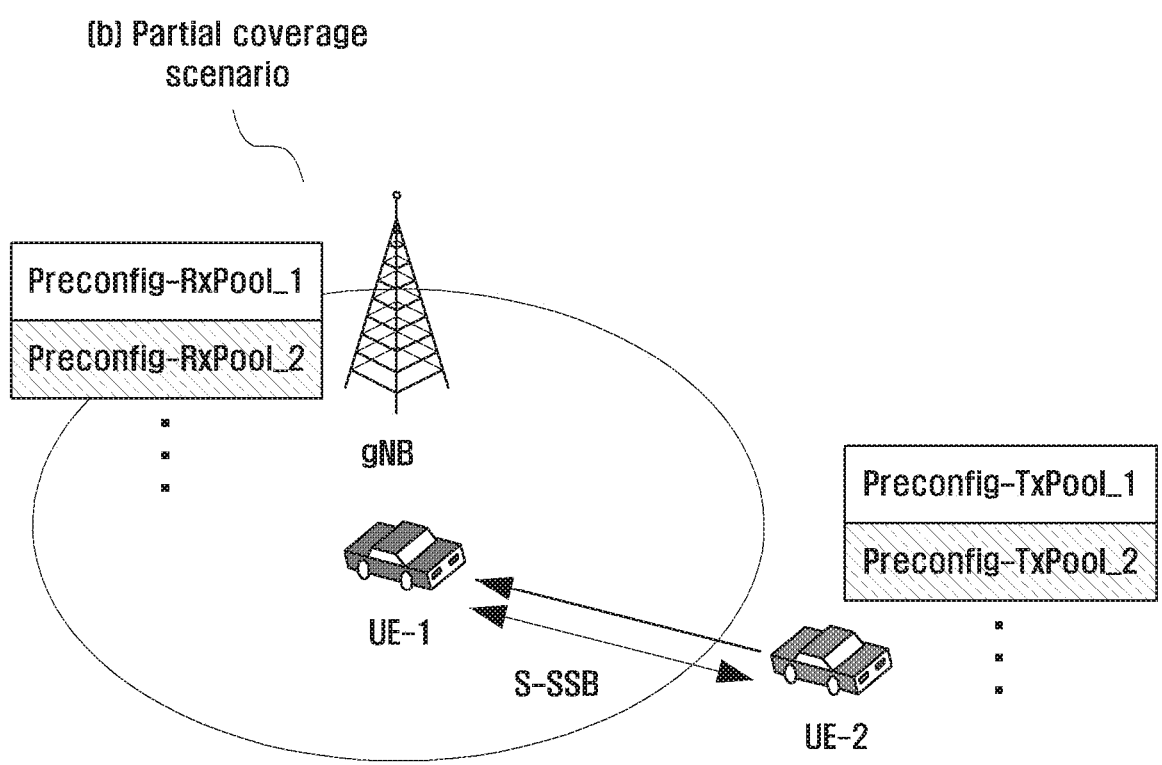

Referring to FIG. 5B, a partial-coverage case where UE-1 is located within the coverage of the base station and UE-2 is located outside the coverage of the base station as described in FIG. 1B is illustrated. In this case, the V2X terminal within the coverage of the base station may be synchronized with the SSB transmitted by the base station, and may be allocated a resource pool that can be used for sidelink communication through V2X-specific SIB information from the base station. However, the V2X terminal outside the coverage of the base station monitors a synchronization signal first to achieve synchronization and, if a synchronization signal is detected, achieves synchronization with the source having transmitted the synchronization signal. If a synchronization signal is not detected, the V2X terminal directly transmits a synchronization signal and attempts to achieve synchronization with a source receiving the synchronization signal. In addition, as the V2X terminal outside the coverage of the base station cannot receive SIB information from the base station, it transmits and receives a signal using a preconfigured resource pool. In FIG. 5B, the resource pool used for transmission by a terminal outside the coverage of the base station is represented by Preconfig-TxPool, and the resource pool used to receive a signal from a terminal outside the coverage of the base station is represented by Preconfig-RxPool. For reference, in FIG. 5B, the resource pools are represented with respect to a case where UE-1 receives the PSCCH and PSSCH from UE-2. In FIG. 5B, UE-1 within the coverage of the base station must perform a synchronization procedure before receiving the PSCCH and PSSCH from UE-2 outside the coverage of the base station. Similarly, UE-2 outside the coverage of the base station must perform a synchronization procedure before receiving the PSCCH and PSSCH from UE-1 within the coverage of the base station. Hence, in the partial coverage scenario of FIG. 5B, if V2X terminals are configured with different parameter information for synchronization signal transmission, a terminal wishing to receive a synchronization signal should obtain configuration information thereabout. Here, the parameter information for synchronization signal reception may include information regarding the subcarrier spacing, CP length, waveform, and time/frequency/code resources for the S-SSB. Additionally, in FIG. 5B, if V2X terminals are configured with different parameter information for PSCCH and PSSCH transmission, UE-1 should obtain configuration information thereabout before receiving the PSCCH and PSSCH from UE-2. Similarly, before receiving the PSCCH and PSSCH from UE-1, UE-2 should obtain configuration information thereabout. Here, the parameter information for PSCCH or PSSCH reception may include information regarding the subcarrier spacing, CP length, waveform, reference signal scrambling ID, and DMRS or CSI-RS patterns for the PSCCH and the PSSCH. In FIG. 5B, if V2X terminals are configured with different parameter information for PSFCH transmission, when a terminal having received the PSCCH and the PSSCH feeds back channel information through the PSFCH, the terminal wishing to receive the feedback information should obtain configuration information about the PSFCH. The parameter information for PSFCH reception may include information regarding the subcarrier spacing, CP length, and waveform for the PSFCH.

Figure 5C:
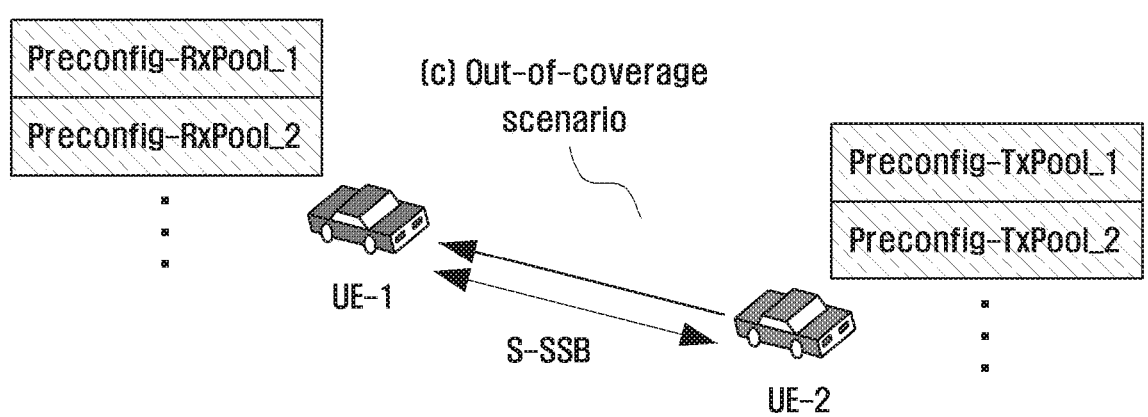

Referring to FIG. 5C, an out-of-coverage case where all V2X terminals are located outside the coverage of the base station as described in FIG. 1C is illustrated. In this case, the V2X terminal outside the coverage of the base station monitors a synchronization signal first to achieve synchronization and, if a synchronization signal is detected, achieves synchronization with the source having transmitted the synchronization signal. If a synchronization signal is not detected, the V2X terminal directly transmits a synchronization signal and attempts to achieve synchronization with a source receiving the synchronization signal. In addition, as the V2X terminal outside the coverage of the base station cannot receive SIB information from the base station, it transmits and receives a signal using a preconfigured resource pool. In FIG. 5C, the resource pool used for transmission by a terminal outside the coverage of the base station is represented by Preconfig-TxPool, and the resource pool used to receive a signal from a terminal outside the coverage of the base station is represented by Preconfig-RxPool. For reference, in FIG. 5C, the resource pools are represented with respect to a case where UE-1 receives the PSCCH and PSSCH from UE-2. In FIG. 5B, UE-1 must perform a synchronization procedure before receiving the PSCCH and PSSCH from UE-2. Similarly, UE-2 must perform a synchronization procedure before receiving the PSCCH and PSSCH from UE-1. Hence, in the out-of-coverage scenario of FIG. 5C, if V2X terminals are configured with different parameter information for synchronization signal transmission, a terminal wishing to receive a synchronization signal should obtain configuration information thereabout. Here, the parameter information for synchronization signal reception may include information regarding the subcarrier spacing, CP length, waveform, and time/frequency/code resources for the S-SSB. Additionally, in FIG. 5C, if V2X terminals are configured with different parameter information for PSCCH and PSSCH transmission, UE-1 should obtain configuration information thereabout before receiving the PSCCH and PSSCH from UE-2. Similarly, before receiving the PSCCH and PSSCH from UE-1, UE-2 should obtain configuration information thereabout. Here, the parameter information for PSCCH or PSSCH reception may include information regarding the subcarrier spacing, CP length, waveform, reference signal scrambling ID, and DMRS or CSI-RS patterns for the PSCCH and the PSSCH. In FIG. 5C, if V2X terminals are configured with different parameter information for PSFCH transmission, when a terminal having received the PSCCH and the PSSCH feeds back channel information through the PSFCH, the terminal wishing to receive the feedback information should obtain configuration information about the PSFCH. The parameter information for PSFCH reception may include information regarding the subcarrier spacing, CP length, and waveform for the PSFCH.

Figure 5D:
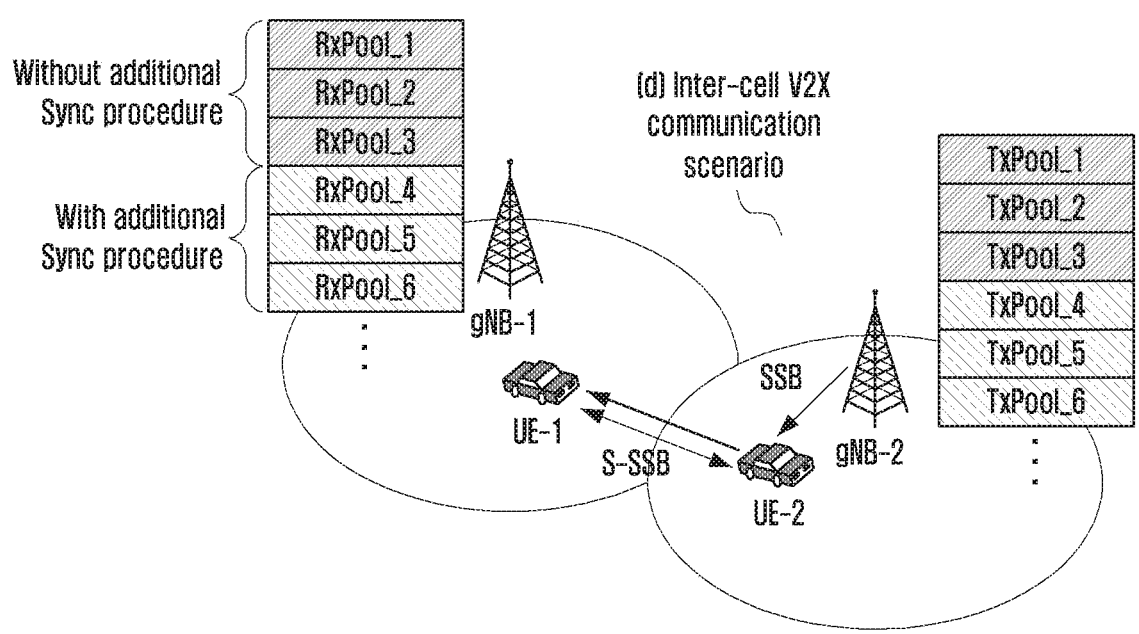

Referring to FIG. 5D, an inter-cell V2X communication case where terminals located in different cells perform V2X communication as described in FIG. 1D is depicted. In this case, the V2X terminal belonging to each cell may achieve synchronization via the PSS/SSS transmitted from the corresponding base station, and may be allocated a resource pool that can be used for sidelink communication through V2X-specific SIB information from the base station. Here, resource pool allocation information may include both pool information about a V2X terminal belonging to one cell and pool information about a V2X terminal belonging to the other cell. In FIG. 5B, the resource pool used by the terminal for transmission is represented by TxPool, and the resource pool used by the terminal for reception is represented by RxPool. For reference, in FIG. 5D, the resource pools are represented with respect to a case where UE-1 receives the PSCCH and PSSCH from UE-2. In FIG. 5D, the RX resource pool information transmitted through the SIB to UE-1 within the coverage of gNB-1 may include RX resource pool information corresponding to the RX resource pool information transmitted from UE-2 within the coverage of gNB-2. In the scenario of FIG. 5D, through information sharing between the base stations, a V2X terminal belonging to one base station may share resource pool information with a V2X terminal belonging to the other base station so that information can be exchanged through the sidelink. Based on the shared resource pool information, the V2X terminals may determine whether an additional synchronization procedure is required before reception of the PSCCH and PSSCH.

For example, in FIG. 5D, it may be assumed that RxPool 1, 2, and 3 are resource pools that are already synchronized before UE-1 receives the PSCCH and PSSCH. In other words, the terminal belonging to each base station is already synchronized with the base station and does not have to achieve additional synchronization for sidelink transmission. In such a case, it is possible for UE-1 and UE-2 to transmit and receive the PSCCH and PSSCH via the sidelink without an additional synchronization procedure. In contrast, in FIG. 5D, it may be assumed that RxPool 4 and 5 are resource pools that require additional synchronization before UE-1 receives the PSCCH and PSSCH. In other words, the terminal belonging to each base station is already synchronized with the base station, but since synchronizations between base stations are different, the terminal needs to achieve additional synchronization for transmission and reception over the sidelink. In such a case, UE-1 and UE-2 must perform an additional synchronization procedure to receive the PSCCH and PSSCH from each other. Here, whether a terminal has to perform an additional synchronization procedure before receiving the PSCCH and PSSCH based on the resource pool may be determined based on whether the resource pool information of the V2X-specific SIB includes a field for parameter information related to another base station. For example, the resource pool RxPool 4 or 5 of FIG. 5D may include a field for parameter information related to a different base station, and this field may include timing and synchronization information of the different base station for synchronization. Here, for instance, the timing information may include UL/DL configuration information of the different base station, and the synchronization information may include physical cell ID and SLSS ID information of the different base station required for synchronization. Hence, when V2X terminals belonging to different base stations transmit and receive via the sidelink by means of information sharing between base stations as shown in FIG. 5D, if it is determined that additional synchronization is necessary based on the resource pool information and the base stations are configured with different parameter information for synchronization signal transmission, the terminal wishing to receive a synchronization signal should obtain the corresponding configuration information.

Here, the parameter information for synchronization signal reception may include information regarding the subcarrier spacing (SCS), CP length, waveform, time/frequency/code resources for the S-SSB. Additionally, in FIG. 5D, if V2X terminals belonging to different base stations are configured with different parameter information for PSCCH and PSSCH transmission, UE-1 should obtain configuration information thereabout before receiving the PSCCH and PSSCH from UE-2. Similarly, before receiving the PSCCH and PSSCH from UE-1, UE-2 should obtain configuration information thereabout. Here, the parameter information for PSCCH or PSSCH reception may include information regarding the subcarrier spacing, CP length, waveform, reference signal scrambling ID, and DMRS or CSI-RS patterns for the PSCCH and the PSSCH. In FIG. 5D, if V2X terminals are configured with different parameter information for PSFCH transmission, when a terminal having received the PSCCH and the PSSCH feeds back channel information through the PSFCH, the terminal wishing to receive the feedback information should obtain configuration information about the PSFCH. The parameter information for PSFCH reception may include information regarding the subcarrier spacing, CP length, and waveform for the PSFCH.

In FIGS. 5A to 5D, the description is focused on the communication between two terminals through the sidelink. However, the proposed method can be applied not only to the communication between the two terminals but also to unicast, groupcast, and broadcast V2X communication as shown in FIG. 2.

As described above with reference to FIGS. 5A to 5D, for a vehicle terminal to exchange information with another vehicle terminal or a pedestrian mobile terminal via the sidelink in NR V2X, it is necessary to obtain in advance configuration information on related parameters. Next, a description is given of various proposed methods for receiving such parameter configuration information, and a description is given of operations of a terminal receiving a parameter configuration according to the proposed methods.

First, a description is given of a proposed method for configuring parameters required for a vehicle terminal to exchange information with another vehicle terminal or a pedestrian mobile terminal via the sidelink in the NR system. As described above with reference to FIGS. 5A to 5D, in a procedure of receiving a synchronization signal block (SSB) from the base station, a procedure of receiving a sidelink synchronization signal block (S-SSB), a procedure for receiving a sidelink control signal (PSCCH) and sidelink data signal (PSSCH), or a procedure for receiving a sidelink feedback signal (PSFCH), when two terminals configured with different parameters try to communicate with each other, they may be able to receive a desired signal only after obtaining the configuration information on the configured parameters.

Specifically, the NR V2X system supports various numerology options, and thus the SCS used for transmitting the SSB, S-SSB, PSCCH, PSSCH, and PSFCH can be set differently between terminals. Use of a large SCS in the V2X system may be very effective for a terminal moving at high speed. The larger the SCS, the shorter the symbol duration, which is advantageous for tracking a channel that changes with time.

According to the numerology μ, the SCS (Δf) and the supported CP length are determined. Table 1 shows the OFDM symbol duration and the CP length according to the numerology.

TABLE 1

| μ | Δf = $2^μ$*15 [kHz] | Cyclic prefix | Symbol duration [μsec] | CP length [μsec] |
|---|---|---|---|---|
| 0 | 15 | Normal | 66.67 | 4.69 |
| 1 | 30 | Normal | 33.33 | 2.34 |
| 2 | 60 | Normal, Extended | 16.67 | 1.17 (4.17 for ECP) |
| 3 | 120 | Normal | 8.33 | 0.59 |
| 4 | 240 | Normal | 4.17 | 0.29 |

Table 2 and Table 3 show the number of OFDM symbols per slot, the number of slots per frame, and the number of slots per subframe in the case of the normal CP (NCP) and the extended CP (ECP), respectively.

TABLE 2

| μ | $N_{symb}^{slot}$ | $N_{slot}^{frame, μ}$ | $N_{slot}^{subframe, μ}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame, u}$ | $N_{slot}^{subframe, u}$ |
|---|---|---|---|
| 2 | 12 | 40 | 4 |

As shown in Tables 1 to 3, when the NCP and the ECP are supported in the NR V2X system, the CP length, the number of OFDM symbols per slot, the number of slots per frame, and the number of slots per subframe usable for transmitting the SSB, S-SSB, PSCCH, PSSCH, or PSFCH may be set differently between terminals.

Both DFT-s-OFDM and CP-OFDM are used as a waveform for uplink transmission between the terminal and the base station in the NR system. Hence, as described above, when the NR V2X terminal supports plural waveforms, it is possible to configure different waveforms for different terminals.

In addition, as described above with reference to FIG. 4, the NR V2X system may support one or more multiplexing methods for the PSCCH and the PSSCH. The configuration for multiplexing may also vary between terminals. The number of symbols carrying the PSCCH may also be fixed or configurable. If the number of symbols carrying the PSCCH is configurable, the configuration thereabout may vary between terminals. Additionally, the NR V2X system may flexibly support the configuration about the PSSCH mapping, the slot in which the PSSCH is transmitted, and the DMRS pattern and thus, parameters thereabout may be set differently between terminals. For example, in the case of the link between the terminal and the base station in the NR system, type A and type B are defined as a mapping type for the physical downlink shared channel (PDSCH) or the physical uplink shared channel (PUSCH). For PDSCH or PUSCH mapping type A, the first symbol of DMRS symbols is located at the second or third OFDM symbol in a slot. For PDSCH or PUSCH mapping type B, the first symbol of DMRS symbols is located at the first OFDM symbol of a time domain resource allocated for PUSCH transmission. In the case of PDSCH or PUSCH data transmission, the time domain resource assignment may be carried by the information about a slot in which data is transmitted, a start symbol position S in the slot, and the number of symbols L to which data is mapped. Here, S may indicate a relative position from the beginning of the slot, and L may indicate the number of consecutive symbols. S and L may be determined based on a start and length indicator value (SLIV) defined as follows.

```
if (L-1)≤7 then
    SLIV=14*(L-1)+S
else
    SLIV=14*(14-L+1)+(14-1-S)
where 0<L≤14-S
```

In the NR system, generally through RRC signaling, the terminal may be configured with a table composed of rows including SLIV value, PDSCH or PUSCH mapping type, and information on a slot in which the PDSCH or PUSCH is transmitted. Thereafter, the base station may indicate an index to the configured table for the time domain resource assignment of the downlink control information (DCI) to thereby transmit the terminal information about the SLIV value, the PDSCH or PUSCH mapping type, and the slot in which the PDSCH or PUSCH is transmitted. Then, detailed information regarding the first symbol position of the DMRS corresponding to the PDSCH or PUSCH mapping type and the DMRS pattern for the PDSCH or PUSCH is configured through RRC signaling. For example, a 4-symbol DMRS pattern may be set for a high speed terminal, and a 2-symbol DMRS pattern may be set for a low speed terminal. When such a flexible approach is applied to the PSSCH of the NR V2X system, information regarding the PSSCH mapping type, the slot which the PSSCH is transmitted, and the DMRS pattern may be set differently between terminals. In addition, when the V2X-specific CSI-RS is introduced to feedback channel information in the NR V2X system, the configuration information thereabout may also vary from terminal to terminal.

According to the above description, in a procedure for receiving a sidelink synchronization signal block (S-SSB) between terminals, a procedure for receiving a sidelink control signal (PSCCH) and a sidelink data signal (PSSCH), and a procedure for receiving a feedback signal (PSFCH), the parameters may be configured differently as follows.

Two terminals may be configured with different information on the parameters for the S-SSB such as the SCS, CP length, waveform, or time/frequency/code resource.

Two terminals may be configured with different information on the parameters for the PSCCH or PSSCH such as the SCS, CP length, waveform, reference signal scrambling ID, DMRS/CSI-RS pattern, or time/frequency/code resource.

Two terminals may be configured with different information on the parameters for the PSFCH such as the SCS, CP length, or waveform.

As described above, when two terminals configured with different parameter configurations try to communicate with each other, it may be possible for one terminal to receive a desired signal only after obtaining configuration information about the parameters set in the other terminal. Therefore, various embodiments in which the base station or the terminal configures the above parameters are proposed as follows. Meanwhile, the process of allocating a resource pool to be used for sidelink communication to the V2X terminal via a V2X-specific SIB transmitted by the base station has been described above. However, in the following description, the resource pool may include not only a resource pool configured based on the SIB received by the terminal from the base station but also a resource pool that is additionally configured by the base station and updated by the terminal in the RRC connected state.

Parameter Configuration Methods in NR Sidelink Communication System

Alt-1: configuration information for the S-SSB or PSCCH/PSSCH/PSFCH of another terminal is linked to the resource pool information in V2X-SIB Alt-2: configuration information for the S-SSB or PSCCH/PSSCH/PSFCH of another terminal is indicated in a field containing parameter information related to another base station among the resource pool information in V2X-SIB Alt-3: configuration information for the S-SSB or PSCCH/PSSCH/PSFCH of another terminal is fixed as default values Alt-4: configuration information for the PSCCH/PSSCH/PSFCH of another terminal is included in the PSBCH Alt-5: configuration information for the PSCCH/PSSCH/PSFCH of another terminal is included in the sidelink control information (SCI) transmitted by the terminal to the another terminal Here, the S-SSB parameter and configuration information of another terminal may include at least one of the following.

Information regarding the SCS, CP length, waveform, or time/frequency/code resources for the S-SSB The PSCCH/PSSCH parameter and configuration information of another terminal may include at least one of the following.

Information regarding the SCS, CP length, waveform, reference signal scrambling ID, DMRS/CSI-RS pattern, or time/frequency/code resources for the PSCCH and PSSCH The PSFCH parameter and configuration information of another terminal may include at least one of the following.

Information regarding the SCS, CP length, or waveform for the PSFCH

The above information regarding time/frequency/code resources may be information on multiplexing of the PSSCH and the PSCCH described in FIG. 4. If one or more of the multiplexing options shown in FIG. 4 are supported, signaling may be required to indicate this.

As described above, the S-SSB may be composed of a SLSS and a PSBCH. In addition, the synchronization procedure using the S-SSB may be performed as follows.

First, the terminal finds a synchronization signal by using the S-SSB reception parameter and configuration information, and if a synchronization signal is detected, achieves synchronization with the detected synchronization signal.

If a synchronization signal is not detected, the terminal transmits the S-SSB by using the S-SSB transmission parameter and configuration information, and achieves synchronization through this.

The S-SSB transmission parameter and configuration information may be the same as or different from the S-SSB reception parameter and configuration information.

Among the above proposed methods, Alt-1 is a method of configuring reception parameter information for the S-SSB, PSCCH, PSSCH, and PSFCH in the RX resource pool information of V2X-SIB. As described above, the resource pool refers to time and frequency resources used by the terminal in V2X to exchange information with another vehicle terminal or pedestrian terminal via the sidelink. For a more detailed configuration according to Alt-1, refer to Embodiment 1 to be described later. Alt-2 is a method of configuring reception parameter information for the S-SSB, PSCCH, PSSCH, and PSFCH in a field containing parameter information related to another base station among the common resource pool information of V2X-SIB. Alt-2, unlike Alt-1, can be used only when the corresponding resource pool information of V2X-SIB includes a field for parameter information related to another base station, and may be suitable for the scenario depicted in FIG. 5D. For a more detailed configuration according to Alt-2, refer to Embodiment 2 to be described later. Alt-3 is a method of fixing configuration information of the S-SSB or PSCCH/PSSCH/PSFCH of another terminal as a default value, and basically does not consider flexible parameter settings of V2X terminals. For a more detailed configuration according to Alt-3, refer to Embodiment 3 to be described later. Alt-4 is an indication method of including configuration information for the PSCCH, PSSCH, and PSFCH of another terminal in the PSBCH. For a more detailed configuration according to Alt-4, refer to Embodiment 4 to be described later. Alt-5 is an indication method of including configuration information for the PSCCH, PSSCH, and PSFCH of another terminal in the SCI. For a more detailed configuration according to Alt-5, refer to Embodiment 5 to be described later.

Figure 6:
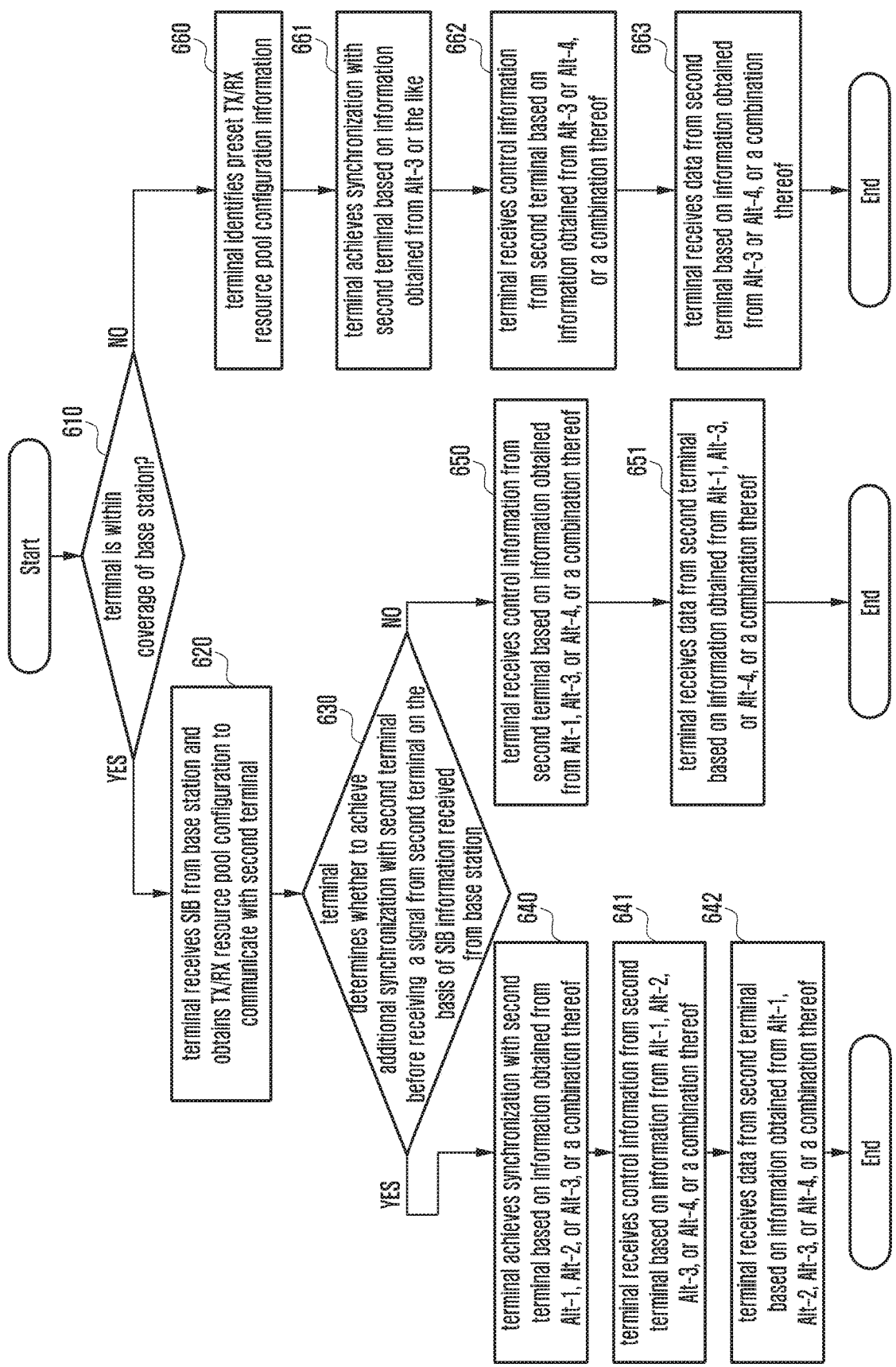
FIG. 6 is a flowchart describing operations of the terminal in the V2X scenarios of FIGS. 5A, 5B, 5C and 5D according to an embodiment of the disclosure.

FIG. 6 is a flowchart describing operations of the terminal in the V2X scenarios of FIGS. 5A, 5B, 5C and 5D according to an embodiment of the disclosure. Applicability of the proposed embodiments may vary depending on the V2X scenarios of FIGS. 5A to 5D.

Referring to FIG. 6, the terminal (first terminal) determines whether it is within the coverage of the base station (610).

Whether a terminal is within the base station coverage may be determined in a synchronization procedure through detection of the SSB transmitted by the base station.

If the first terminal is within the coverage of the base station, the first terminal obtains the V2X-SIB transmitted by the base station and receives a TX/RX resource pool configuration to communicate with another terminal (second terminal) (620).

Thereafter, the first terminal determines whether to achieve additional synchronization with the second terminal before receiving a signal from the second terminal on the basis of the V2X-SIB information transmitted by the corresponding base station (630).

Whether an additional synchronization procedure is required may be determined according to whether the resource pool information in the V2X-SIB includes a field for parameter information related to another base station.

Upon determining to achieve additional synchronization, the first terminal performs a synchronization procedure with the second terminal before receiving the PSCCH/PSSCH.

The first terminal achieves synchronization with the second terminal by using Alt-1, Alt-2, or Alt-3, or a combination thereof (640).

When Alt-1 is applied, the terminal makes synchronization by using the SS-SSB parameter and configuration information set in the resource pool information of the V2X-SIB.

When Alt-2 is applied, the terminal makes synchronization by using the SS-SSB parameters and configuration information set in the field containing parameter information related to another base station in the resource pool information of the V2X-SIB.

When Alt-3 is applied, the terminal makes synchronization by using preset SS-SSB parameter and configuration information.

The first terminal receives the PSCCH transmitted by the second terminal based on information obtained according to Alt-1, Alt-2, Alt-3, Alt-4, or Alt-5 or a combination thereof (641).

When Alt-1 is applied, the terminal makes synchronization or receives the PSCCH by using the PSCCH parameter and configuration information set in the resource pool information of the V2X-SIB.

When Alt-2 is applied, the terminal makes synchronization or receives the PSCCH by using the PSCCH parameter and configuration information set in the field containing parameter information related to another base station among the resource pool information of the V2X-SIB.

When Alt-3 is applied, the terminal makes synchronization or receives the PSCCH by using the preset PSCCH parameter and configuration information.

When Alt-4 is applied, the terminal receives the PSCCH by using the PSCCH parameter and configuration information set in the PSBCH received through the S-SSB.

When Alt-5 is applied, the terminal receives the PSCCH by using the PSCCH parameter and configuration information received through the SCI.

The first terminal receives the PSSCH transmitted by the second terminal based on information obtained according to Alt-1, Alt-2, Alt-3, Alt-4, or Alt-5 or a combination thereof (642).

When Alt-1 is applied, the terminal makes synchronization by using the PSSCH parameter and configuration information set in the resource pool information of the V2X-SIB.

When Alt-2 is applied, the terminal makes synchronization or receives the PSSCH by using the PSSCH parameter and configuration information set in the field containing parameter information related to another base station among the resource pool information of the V2X-SIB.

When Alt-3 is applied, the terminal makes synchronization or receives the PSSCH by using the preset PSSCH parameter and configuration information.

When Alt-4 is applied, the terminal receives the PSCCH or PSSCH by using the PSSCH parameter and configuration information set in the PSBCH received through the S-SSB.

When Alt-5 is applied, the terminal receives the PSSCH by using the PSSCH parameter and configuration information received through the SCI.

Upon determining not to achieve additional synchronization, the first terminal immediately receives the PSCCH/PSSCH.

The first terminal receives the PSCCH transmitted by the second terminal based on information obtained according to Alt-1, Alt-3, Alt-4, or Alt-5 or a combination thereof (650).

When Alt-1 is applied, the terminal makes synchronization or receives the PSCCH by using the PSCCH parameter and configuration information set in the resource pool information of the V2X-SIB.

When Alt-3 is applied, the terminal makes synchronization or receives the PSCCH by using the preset PSCCH parameter and configuration information.

When Alt-4 is applied, the terminal receives the PSCCH by using the PSCCH parameter and configuration information set in the PSBCH received through the S-SSB.

When Alt-5 is applied, the terminal receives the PSCCH by using the PSCCH parameter and configuration information received through the SCI.

The first terminal receives the PSSCH transmitted by the second terminal based on information obtained according to Alt-1, Alt-3, Alt-4, or Alt-5 or a combination thereof (651).

When Alt-1 is applied, the terminal makes synchronization or receives the PSSCH by using the PSSCH parameter and configuration information set in the resource pool information of the V2X-SIB.

When Alt-3 is applied, the terminal makes synchronization or receives the PSSCH by using the preset PSSCH parameter and configuration information.

When Alt-4 is applied, the terminal receives the PSCCH or PSSCH by using the PSSCH parameter and configuration information set in the PSBCH received through the S-SSB.

When Alt-5 is applied, the terminal receives the PSSCH by using the PSSCH parameter and configuration information received through the SCI.

If the first terminal is not within the coverage of the base station, the first terminal obtains preset TX/RX resource pool information (660).

The first terminal makes synchronization with the second terminal by using the S-SSB parameter and configuration information preset according to Alt-3 (661).

The first terminal receives the PSCCH transmitted by the second terminal based on information obtained according to Alt-3, Alt-4, or Alt-5 or a combination thereof (662).

When Alt-3 is applied, the terminal receives the PSCCH by using the preset PSCCH reception parameter and configuration information.

When Alt-4 is applied, the terminal receives the PSCCH by using the PSCCH reception parameter and configuration information set in the PSBCH received through the S-SSB.

When Alt-5 is applied, the terminal receives the PSCCH by using the PSCCH parameter and configuration information received through the SCI.

The first terminal receives the PSSCH transmitted by the second terminal based on information obtained according to Alt-3, Alt-4, or Alt-5 or a combination thereof (663).

When Alt-3 is applied, the terminal receives the PSSCH by using the preset PSSCH reception parameter and configuration information.

When Alt-4 is applied, the terminal receives the PSSCH by using the PSSCH reception parameter and configuration information set in the PSBCH received through the S-SSB.

When Alt-5 is applied, the terminal receives the PSSCH by using the PSSCH parameter and configuration information received through the SCI.

In the above description, some of the parameter information for the SSB may be the same as or different from the configuration of S-SSB TX/RX parameters. Some of the parameter information for the S-SSB may be the same as or different from the configuration of PSCCH/PSSCH TX/RX parameters. In the above description, the communication between two terminals through the sidelink has been described, but the proposed method can be applied not only to the communication between two terminals but also to unicast, groupcast, and broadcast V2X communication described in FIG. 2. Reception of S-SSB, PSCCH and PSSCH signals at operations 640, 641 and 642 in FIG. 6 can be applied to the scenario of FIG. 5D. Reception of PSCCH and PSSCH signals at operations 650 and 651 in FIG. 6 can be applied to the scenarios of FIGS. 5A and 5D. Finally, reception of S-SSB, PSCCH and PSSCH signals at operations 661, 662 and 663 in FIG. 6 can be applied to the scenarios of FIGS. 5B and 5C.

Embodiment 1

Embodiment 1 of the disclosure describes Alt-1 in more detail among the proposed methods for configuring parameters in the NR sidelink communication system. Alt-1 is a method of configuring parameter information for receiving the S-SSB, PSCCH, PSSCH or PSFCH in the resource pool information of the V2X-SIB. As described above, the resource pool refers to time and frequency resources used by a vehicle terminal in V2X to exchange information with another vehicle terminal or a pedestrian mobile terminal via the sidelink. When the concept of bandwidth part (BWP) is introduced as in the NR base station-terminal system, a resource pool may be defined within the configured BWP. A description is given of Alt-1 operations with reference to Table 4 below. Table 4 describes TX/RX resource pool information configured in the V2X SIB. Specifically, the SL-CommResourcePoolV2X field of Table 4 includes configuration information for the resource pool. To enable two terminals configured with different parameters to communicate via sidelink communication, this field may be used to include and set parameter information between terminals as follows. The parameter information related to the SL-CommResourcePoolV2X field may include at least one of the following items.

S-SSB-Tx

Information regarding the subcarrier spacing (SCS), CP length, waveform, and time/frequency/code resources for S-SSB transmission of the terminal may be included.

PSCCH-PSSCH-Tx
  Information regarding the subcarrier spacing (SCS), CP length, waveform, reference signal scrambling ID, DMRS/CSI-RS pattern for PSCCH or PSSCH transmission of the terminal may be included.
  This information may be subdivided by PSCCH-Tx and PSSCH-Tx, and the PSCCH-Tx information and the PSSCH-Tx information may be configured separately.
PSFCH-Tx
  Information regarding the subcarrier spacing (SCS), CP length, and waveform for PSFCH transmission of the terminal may be included.
S-SSB-Rx
  Information regarding the subcarrier spacing (SCS), CP length, waveform, and time/frequency/code resources for S-SSB reception of the terminal may be included.
PSCCH-PSSCH-Rx
  Information regarding the subcarrier spacing (SCS), CP length, waveform, reference signal scrambling ID, DMRS/CSI-RS pattern for PSCCH or PSSCH reception of the terminal may be included.
  This information may be subdivided by PSCCH-Rx and PSSCH-Rx, and the PSCCH-Rx information and the PSSCH-Rx information may be configured separately.
PSFCH-Rx
  Information regarding the subcarrier spacing (SCS), CP length, and waveform for PSFCH reception of the terminal may be included.

obtain parameter information set in the SL-CommResourcePoolV2X field of the V2X SIB in the following manner.
  For S-SSB parameter and configuration information through Alt-1, the terminal reads the V2X-SIB transmitted by the corresponding base station and obtains at least one of the following information items.
    1) S-SSB transmission parameter and configuration information that can be transmitted by the terminal (refer to S-SSB-Tx in Table 4)
    2) S-SSB reception parameter and configuration information that the terminal can receive from another terminal (refer to S-SSB-Rx in Table 4)
    If only 1) is obtained, the terminal performs S-SSB transmission or S-SSB reception by using the parameter and configuration information in 1)
    If only 2) is obtained, the terminal performs S-SSB transmission or S-SSB reception by using the parameter and configuration information in 2)
    If both 1) and 2) are obtained, the terminal performs S-SSB transmission by using the information in 1) and performs S-SSB reception by using the information in 2)
  For PSCCH/PSSCH parameter and configuration information through Alt-1, the terminal reads the V2X-SIB transmitted by the corresponding base station and obtains at least one of the following information items.
    1) PSCCH/PSSCH transmission parameter and configuration information that can be transmitted by the terminal (refer to PSCCH-PSSCH-Tx in Table 4)
    2) PSCCH/PSSCH reception parameter and configuration information that the terminal can receive from another terminal (refer to PSCCH-PSSCH-Rx in Table 4)

TABLE 4

```
-- ASN1 START
SL-CommTxPoolListV2X ::=    SEQUENCE (SIZE (1..maxSL-V2X-TxPool)) OF SL-
CommResourcePoolV2X
SL-CommRxPoolListV2X ::=    SEQUENCE (SIZE (1..maxSL-V2X-RxPool)) OF SL-
CommResourcePoolV2X
SL-CommResourcePoolV2X ::=  SEQUENCE {
    sl-OffsetIndicator
    sl-Subframe
    adjacencyPSCCH-PSSCH
    sizeSubchannel
    numSubchannel
    startRB-Subchannel
    startRB-PSCCH-Pool
    SSB-Tx
    PSCCH-PSSCH-Tx
    PSFCH-Tx
    SSB-Rx
    PSCCH-PSSCH-Rx
    PSFCH-Rx
    rxParametersNCell           SEQUENCE {
        tdd-Config
        syncConfigIndex
    }                           OPTIONAL,  -- Need OR
    dataTxParameters
    zoneID
    threshS-RSSI-CBR
    poolReportId
    ...
}
-- ASN1STOP
```

In Table 4, the parameters set in the SL-CommResourcePoolV2X field may be separately set for each Tx/Rx resource pool in SL-CommTxPoolListV2X and SL-CommRxPoolListV2X. Thereafter, the terminal may If only 1) is obtained, the terminal performs PSCCH/PSSCH transmission or PSCCH/PSSCH reception by using the parameter and configuration information in 1)

If only 2) is obtained, the terminal performs PSCCH/PSSCH transmission or PSCCH/PSSCH reception by using the parameter and configuration information in 2)

If both 1) and 2) are obtained, the terminal performs PSCCH/PSSCH transmission by using the information in 1) and performs PSCCH/PSSCH reception by using the information in 2)

Embodiment 2

Embodiment 2 of the disclosure describes Alt-2 in more detail among the proposed methods for configuring parameters in the NR sidelink communication system. Alt-2, unlike Alt-1, is a method of configuring reception parameter information for the S-SSB, PSCCH, and PSSCH in the field containing parameter information related to another base station among the common resource pool information of the V2X-SIB. Alt-2 is a method of configuring S-SSB/PSCCH/PSSCH reception parameter information in the field containing parameter information related to another base station of the common resource pool information in the V2X-SIB. When the concept of bandwidth part (BWP) is introduced as in the NR base station-terminal system, a resource pool may be defined within the configured BWP. Alt-2, unlike Alt-1, can be used only when the corresponding resource pool information of the V2X-SIB has a field for parameter information related to another base station, which is more suitable for the scenario of FIG. 5D. A description is given of Alt-2 operations with reference to Table 5 below. Table 5 describes TX/RX resource pool information configured in the V2X SIB. Specifically, the SL-CommResourcePoolV2X field in Table 5 includes configuration information about the resource pool, and the rxParametersNCell field includes parameter information related to another base station. To enable two terminals configured with different parameters to communicate via sidelink communication, unlike Alt-1, the rxParametersNCell field is used to include and configure the reception parameter information for the Rx resource pool in Alt-2. Transmission parameter information for the Tx resource pool is configured in the same manner as to Alt-1. For Alt-2, the parameter information related to the SL-CommResourcePoolV2X field may include at least one of the following items.

S-SSB-Tx
  Information regarding the subcarrier spacing (SCS), CP length, waveform, and time/frequency/code resources for S-SSB transmission of the terminal may be included.
PSCCH-PSSCH-Tx
  Information regarding the subcarrier spacing (SCS), CP length, waveform, reference signal scrambling ID, DMRS/CSI-RS pattern for PSCCH or PSSCH transmission of the terminal may be included.
  This information may be subdivided by PSCCH-Tx and PSSCH-Tx, and the PSCCH-Tx information and the PSSCH-Tx information may be configured separately.
PSFCH-Tx
  Information regarding the subcarrier spacing (SCS), CP length, and waveform for PSFCH transmission of the terminal may be included.
S-SSB-Rx
  Information regarding the subcarrier spacing (SCS), CP length, waveform, and time/frequency/code resources for S-SSB reception of the terminal may be included.
PSCCH-PSSCH-Rx
  Information regarding the subcarrier spacing (SCS), CP length, waveform, reference signal scrambling ID, DMRS/CSI-RS pattern for PSCCH or PSSCH reception of the terminal may be included.
  This information may be subdivided by PSCCH-Rx and PSSCH-Rx, and the PSCCH-Rx information and the PSSCH-Rx information may be configured separately.
PSFCH-Rx
  Information regarding the subcarrier spacing (SCS), CP length, and waveform for PSFCH reception of the terminal may be included.

TABLE 5

```
-- ASN1START
SL-CommTxPoolListV2X ::=        SEQUENCE (SIZE (1..maxSL-V2X-TxPool)) OF SL-
CommResourcePoolV2X
SL-CommRxPoolListV2X ::=        SEQUENCE (SIZE (1..maxSL-V2X-RxPool)) OF SL-
CommResourcePoolV2X
SL-CommResourcePoolV2X ::= SEQUENCE {
    sl-OffsetIndicator
    sl-Subframe
    adjacencyPSCCH-PSSCH
    sizeSubchannel
    numSubchannel
    startRB-Subchannel
    startRB-PSCCH-Pool
    S-SSB-Tx
    PSCCH-PSSCH-Tx
    PSFCH-Tx
    rxParametersNCell           SEQUENCE {
        tdd-Config
        syncConfigIndex
        SSB-Rx
        PSCCH-PSSCH-Rx
        PSFCH-Rx
    }
                                OPTIONAL,  -- Need OR
    dataTxParameters
    zoneID
    threshS-RSSI-CBR
    poolReportId
```

TABLE 5-continued

```
    ...
}
-- ASN1STOP
```

In Table 5, the parameters set in the SL-CommResourcePoolV2X field may be separately set for each Tx/Rx resource pool in SL-CommTxPoolListV2X and SL-CommRxPoolListV2X. The rxParametersNCell field may be set only when an additional synchronization procedure is needed as described with reference to FIG. 5D. Thereafter, the terminal may obtain parameter information set in the SL-CommResourcePoolV2X field of the V2X SIB in the following manner.

- For S-SSB parameter and configuration information through Alt-2, the terminal reads the V2X-SIB transmitted by the corresponding base station and obtains at least one of the following information items.
  1) S-SSB transmission parameter and configuration information that can be transmitted by the terminal (refer to S-SSB-Tx in Table 5)
  2) S-SSB reception parameter and configuration information that the terminal can receive from another terminal (refer to S-SSB-Rx in Table 5)
  - If only 1) is obtained, the terminal performs S-SSB transmission or S-SSB reception by using the parameter and configuration information in 1)
  - If only 2) is obtained, the terminal performs S-SSB transmission or S-SSB reception by using the parameter and configuration information in 2)
  - If both 1) and 2) are obtained, the terminal performs S-SSB transmission by using the information in 1) and performs S-SSB reception by using the information in 2)
- For PSCCH/PSSCH parameter and configuration information through Alt-2, the terminal reads the V2X-SIB transmitted by the corresponding base station and obtains at least one of the following information items.
  1) PSCCH/PSSCH transmission parameter and configuration information that can be transmitted by the terminal (refer to PSCCH-PSSCH-Tx in Table 5)
  2) PSCCH/PSSCH reception parameter and configuration information that the terminal can receive from another terminal (refer to PSCCH-PSSCH-Rx in Table 5)
  - If only 1) is obtained, the terminal performs PSCCH/PSSCH transmission or PSCCH/PSSCH reception by using the parameter and configuration information in 1)
  - If only 2) is obtained, the terminal performs PSCCH/PSSCH transmission or PSCCH/PSSCH reception by using the parameter and configuration information in 2)
  - If both 1) and 2) are obtained, the terminal performs PSCCH/PSSCH transmission by using the information in 1) and performs PSCCH/PSSCH reception by using the information in 2)

In the case of Alt-2, unlike Alt-1, reception parameters for the Rx resource pool can be set only when the rxParametersNCell field is present.

Embodiment 3

Embodiment 3 of the disclosure describes Alt-3 in more detail among the proposed methods for configuring parameters in the NR sidelink communication system. Alt-3 is a method of fixing configuration information of the S-SSB or PSCCH/PSSCH/PSFCH of another terminal as a default value, and basically does not consider flexible parameter settings of V2X terminals. Below, a description is given of the parameters that can be desirable to have a fixed configuration according to Alt-3.

For Alt-3, the S-SSB parameter and configuration information of another terminal may include at least one of the following items.

- Information regarding the subcarrier spacing (SCS), CP length, waveform, and time/frequency/code resources for the S-SSB For Alt-3, the PSCCH/PSSCH parameter and configuration information of another terminal may include at least one of the following items.

- Information regarding the subcarrier spacing (SCS), CP length, waveform, reference signal scrambling ID, DMRS/CSI-RS pattern for the PSCCH or PSSCH Some of the above parameters may be preferably fixed for Alt-3 as follows.

- Subcarrier spacing (SCS)
  - In FR1 (frequency range 1, low frequency range), the SCS is fixed to 30 kHz.
  - In FR2 (frequency range 2, high frequency range), the SCS is fixed to 60 kHz.
  - This SCS may be equally applied to the SSB, S-SSB, PSCCH and PSSCH.
- Waveform
  - The waveform used in the V2X system is fixed to CP-OFDM.

In relation to the proposed method Alt-3, a description is given first of the background of fixing the subcarrier spacing as described above. In the NR sidelink communication system, {15, 30, 60} kHz may be considered for the SCS in the low frequency range (FR1), and {60, 120} kHz may be considered for the SCS in the high frequency range (FR2). As described above, in the V2X system, the subcarrier spacing of 15 kHz may be inappropriate to support the channel estimation in time for a high-speed terminal up to 500 km/h. Hence, it may be desirable to fix the subcarrier spacing to 30 kHz in the low frequency range (FR1) and to 60 kHz in FR2 when the high frequency range (FR2) is also supported. Next, in the case of the waveform, as the environment of the communication between terminals in the V2X system is not the same as the environment of the uplink between the terminal and the base station where the coverage is important and thus the peak to average power ratio (PAPR) is important, unlike using DFT-S-OFDM in the LTE V2X system, it may be desirable to fix the waveform to CP-OFDM in the NR V2X system. For CP-OFDM, if the CSI-RS for V2X is introduced, it is possible to reuse the CSI-RS patterns introduced in the NR link between the base station and the terminal. As the CSI-RS can be used to improve performance through channel information feedback in unicast or groupcast communication, it may be desirable to signal pattern information or period information of the CSI-RS through the sidelink control information (SCI). The SCI indicates control information transmitted over the PSCCH.

Embodiment 4

Embodiment 4 of the disclosure describes Alt-4 in more detail among the proposed methods for configuring parameters in the NR sidelink communication system. Alt-4 is an indication method of including PSCCH/PSSCH configuration information of another terminal in the PSBCH. A description is given of Alt-4 operations with reference to Table 6 below. Table 6 shows the information that can be included in the PSBCH. To enable two terminals configured with different parameters to communicate via sidelink communication, it is possible to include and configure the parameter information between terminals in the following manner. The parameter information in the PSBCH for Alt-2 may include at least one of the following items.

PSCCH-PSSCH-Tx
  Information regarding the subcarrier spacing, CP length, waveform, reference signal scrambling ID, DMRS/CSI-RS pattern for PSCCH or PSSCH transmission of the terminal may be included.
  This information may be subdivided by PSCCH-Tx and PSSCH-Tx, and the PSCCH-Tx information and the PSSCH-Tx information may be configured separately.
PSCCH-PSSCH-Rx
  Information regarding the subcarrier spacing, CP length, waveform, reference signal scrambling ID, DMRS/CSI-RS pattern for PSCCH or PSSCH reception of the terminal may be included.
  This information may be subdivided by PSCCH-Rx and PSSCH-Rx, and the PSCCH-Rx information and the PSSCH-Rx information may be configured separately.

TABLE 6

| PSBCH contents | Number of bits |
| --- | --- |
| bandwidth | 3 bit |
| TDD UL/DL configuration | 3 bits |
| Frame number | 10 bits |
| Subframe number | 4 bits |
| In-coverage indicator | 1 bit |
| PSCCH-PSSCH-Tx | A bits |
| PSCCH-PSSCH-Rx | B bits |
| Reserved field | 27 bits |

In Table 6, for the configuration information about the PSCCH/PSSCH, the number of bits A and B for PSCCH-PSSCH-Tx and PSCCH-PSSCH-Rx may vary according to the included parameters. An example for the number of bits is given below. Thereafter, the terminal may obtain parameter information set in the PSBCH in the following manner.

When Alt-4 is applied, the terminal decodes the PSBCH to obtain at least one of the following information.
  1) PSCCH/PSSCH transmission parameter and configuration information that can be transmitted by the terminal
  2) PSCCH/PSSCH reception parameter and configuration information that the terminal can receive from another terminal
  If only 1) is obtained, the terminal performs PSCCH/PSSCH transmission or PSCCH/PSSCH reception by using the parameter and configuration information in 1)
  If only 2) is obtained, the terminal performs PSCCH/PSSCH transmission or PSCCH/PSSCH reception by using the parameter and configuration information in 2)
  If both 1) and 2) are obtained, the terminal performs PSCCH/PSSCH transmission by using the information in 1) and performs PSCCH/PSSCH reception by using the information in 2)

Figure 7:
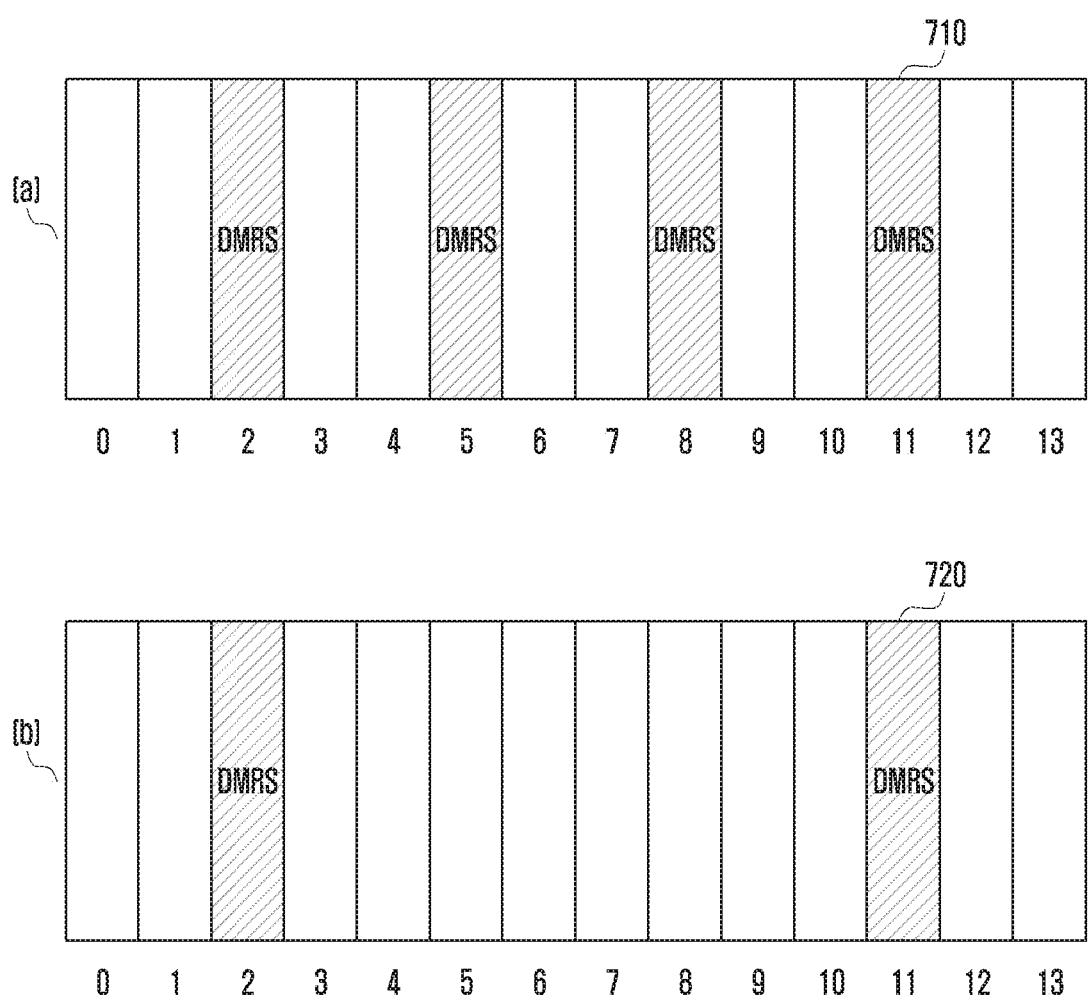
FIG. 7 illustrates examples of demodulation reference signal (DMRS) patterns for the physical downlink shared channel (PDSCH) in association with configuration information according to an embodiment of the disclosure.

FIG. 7 illustrates examples of demodulation reference signal (DMRS) patterns for the physical downlink shared channel (PDSCH) in association with configuration information according to an embodiment of the disclosure.

Referring to FIG. 7, when DMRS pattern information for the PDSCH is included in Table 6, a DMRS pattern of 4 symbols may be defined to support a high speed environment and a DMRS pattern of 2 symbols may be defined to support a low speed environment. This pattern information of 1 bit may be included in the PSBCH information. Part (a) of FIG. 7 illustrates a 4-symbol pattern 710 and part (b) of FIG. 7 illustrates a 2-symbol pattern 720. The position of the pattern is not limited to the illustration of FIG. 7.

Embodiment 5

Embodiment 5 of the disclosure describes Alt-5 in more detail among the proposed methods for configuring parameters in the NR sidelink communication system. Alt-5 is a method of configuring reception parameter information for the S-SSB, PSCCH, PSSCH and PSFCH in a specific field of the SCI transmitted between terminals. For Alt-5, the parameter information contained in the SCI may include at least one of the following items. The parameter information included in the SCI according to Embodiment 5 may be the same as or different from the parameter information obtained by the terminal according to Embodiments 1 to 4.

PSCCH-PSSCH-Tx
  Information regarding the subcarrier spacing (SCS), CP length, waveform, reference signal scrambling ID, DMRS/CSI-RS pattern for PSCCH or PSSCH transmission of the terminal may be included.
  This information may be subdivided by PSCCH-Tx and PSSCH-Tx, and the PSCCH-Tx information and the PSSCH-Tx information may be configured as separate fields.
PSFCH-Tx
  Information regarding the subcarrier spacing (SCS), CP length, and waveform for PSFCH transmission of the terminal may be included.
PSCCH-PSSCH-Rx
  Information regarding the subcarrier spacing (SCS), CP length, waveform, reference signal scrambling ID, DMRS/CSI-RS pattern for PSCCH or PSSCH reception of the terminal may be included.
  This information may be subdivided by PSCCH-Rx and PSSCH-Rx, and the PSCCH-Rx information and the PSSCH-Rx information may be configured as separate fields.
PSFCH-Rx
  Information regarding the subcarrier spacing (SCS), CP length, and waveform for PSFCH reception of the terminal may be included.

When Alt-5 is applied, the terminal decodes the SCI to obtain at least one of the following information.
  1) PSCCH/PSSCH transmission parameter and configuration information that can be transmitted by the terminal
  2) PSCCH/PSSCH reception parameter and configuration information that the terminal can receive from another terminal If only 1) is obtained, the terminal performs PSCCH/PSSCH transmission or PSCCH/PSSCH reception by using the parameter and configuration information in 1)

If only 2) is obtained, the terminal performs PSCCH/PSSCH transmission or PSCCH/PSSCH reception by using the parameter and configuration information in 2)

If both 1) and 2) are obtained, the terminal performs PSCCH/PSSCH transmission by using the information in 1) and performs PSCCH/PSSCH reception by using the information in 2)

Embodiment 6

In Embodiments 1 to 5, a description has been given of a method that enables one terminal to receive S-SSB, PSCCH, PSSCH, and PSFCH signals from another terminal configured with different parameter information about the S-SSB, PSCCH, PSSCH and PSFCH by identifying the configuration information thereabout. Embodiment 6 of the disclosure proposes a method that prevents one terminal from receiving S-SSB, PSCCH, PSSCH, and PSFCH signals from another terminal configured with different parameter information about the S-SSB, PSCCH, PSSCH and PSFCH. Specifically, this may be achieved by specifying in the standard that the terminal does not expect to receive S-SSB, PSCCH, PSSCH, and PSFCH signals having different configurations. However, unlike the methods proposed in Embodiments 1 to 5, this method may fail to receive a sidelink signal in a certain scenario.

Figure 8:
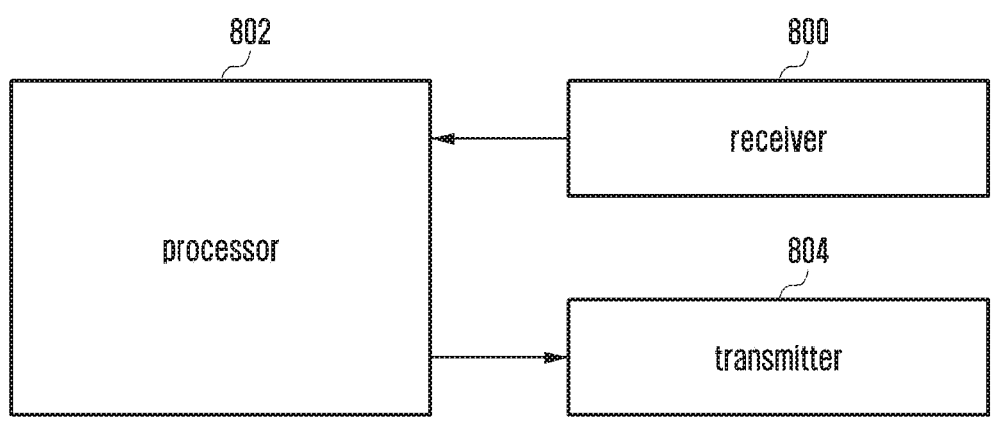
FIG. 8 is a block diagram of a terminal according to an embodiment of the disclosure.
Figure 9:
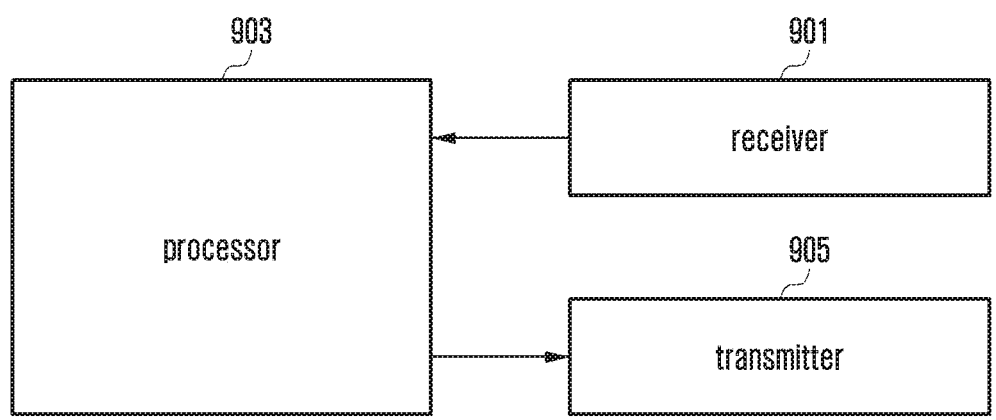
FIG. 9 is a block diagram of a base station according to an embodiment of the disclosure.

To carry out the above-described embodiments of the disclosure, the terminal including a transmitter, a receiver and a processor is shown in FIG. 8, and the base station including a transmitter, a receiver and a processor is shown in FIG. 9. The first to sixth embodiments have described a parameter configuration method that enables terminals configured with different parameters to communicate via sidelink communication. To perform the method, the base station and the terminal should operate according to the embodiments.

FIG. 8 is a block diagram of the terminal according to an embodiment of the disclosure.

Referring to FIG. 8, the terminal may include a receiver 800, a transmitter 804, and a processor 802. In one embodiment, the receiver 800 and the transmitter 804 may be collectively referred to as a transceiver. The transceiver can transmit and receive a signal to and from the base station. The signal may include control information and data. To this end, the transceiver may include an RF (radio frequency) transmitter for up-converting and amplifying the frequency of a signal to be transmitted, and an RF receiver for low-noise amplifying a received signal and down-converting the frequency of the received signal. In addition, the transceiver may receive a signal through a wireless channel and forward it to the processor 802, and transmit a signal output from the processor 802 through a wireless channel. The processor 802 may control a series of operations so that the terminal can operate according to the embodiments of the disclosure described above.

FIG. 9 is a block diagram of the base station according to an embodiment of the disclosure.

Referring to FIG. 9, the base station may include a receiver 901, a transmitter 905, and a processor 903. In one embodiment, the receiver 901 and the transmitter 905 may be collectively referred to as a transceiver. The transceiver can transmit and receive a signal to and from a terminal. The signal may include control information and data. To this end, the transceiver may include an RF transmitter for up-converting and amplifying the frequency of a signal to be transmitted, and an RF receiver for low-noise amplifying a received signal and down-converting the frequency of the received signal. In addition, the transceiver may receive a signal through a wireless channel and forward it to the processor 903, and transmit a signal output from the processor 903 through a wireless channel. The processor 903 may control a series of operations so that the base station can operate according to the embodiments of the disclosure described above.

In the embodiments of the disclosure, the elements included in the disclosure are expressed in a singular or plural form according to the proposed specific embodiment. However, the singular or plural expression is appropriately selected for ease of description according to the presented situation, and the disclosure is not limited to a single element or plural elements. Those elements described in a plural form may be configured as a single element, and those elements described in a singular form may be configured as plural elements.

While the disclosure has been shown and described with reference to various embodiments thereof, it will be understood by those skilled in the art that various changes in form and details may be made therein without departing from the spirit and scope of the disclosure as defined in the appended claims and their equivalents.

What is claimed is:

1. A method for vehicle-to-everything (V2X) communication performed by a first terminal in a wireless communication system, the method comprising:

receiving, from a base station, a V2X system information block (V2X-SIB) including resource pool information associated with a second terminal, the resource pool information including a first parameter associated with a numerology for the first terminal and a second parameter associated with a numerology for the second terminal;

identifying whether the first parameter is different from the second parameter based on the V2X-SIB;

determining at least one parameter associated with a numerology of a sidelink signal to be transmitted to the second terminal based on the second parameter, in case that the first parameter and the second parameter are different; and transmitting, to the second terminal, the sidelink signal based on the determined at least one parameter.

2. The method of claim 1, wherein the at least one parameter is determined further based on information included in a field associated with another base station included in the resource pool information of the V2X-SIB.

3. The method of claim 1, wherein the sidelink signal comprises at least one of a sidelink synchronization signal block (S-SSB), a physical sidelink shared channel (PSSCH), a physical sidelink control channel (PSCCH), or a physical sidelink feedback channel (PSFCH).

4. The method of claim 1, wherein the at least one parameter comprises at least one of a subcarrier spacing (SCS), a cyclic prefix (CP) length, or a waveform for transmitting the sidelink signal.

5. The method of claim 1, wherein the first terminal is a sidelink transmitting terminal and the second terminal is a sidelink receiving terminal.

6. A first terminal configured to perform vehicle-to-everything (V2X) communication in a wireless communication system, comprising:

a transceiver configured to transmit and receive a signal; and a controller configured to:
- receive, from a base station, a V2X system information block (V2X-SIB) including resource pool information associated with a second terminal, the resource pool information including a first parameter associated with a numerology for the first terminal and a second parameter associated with a numerology for the second terminal,
- identify whether the first parameter is different from the second parameter based on the V2X-SIB,
- determine at least one parameter associated with a numerology of a sidelink signal to be transmitted to the second terminal based on the second parameter, in case that the first parameter and the second parameter are different, and
- transmit, to the second terminal, the sidelink signal based on the determined at least one parameter.

7. The first terminal of claim 6, wherein the at least one parameter is determined further based on information included in a field related to another base station included in the resource pool information of the V2X-SIB.

8. The first terminal of claim 6, wherein the sidelink signal comprises at least one of a sidelink synchronization signal block (S-SSB), a physical sidelink shared channel (PSSCH), a physical sidelink control channel (PSCCH), or a physical sidelink feedback channel (PSFCH).

9. The first terminal of claim 6, wherein the at least one parameter comprises at least one of a subcarrier spacing (SCS), a cyclic prefix (CP) length, or a waveform for transmitting the sidelink signal.

10. The first terminal of claim 6, wherein the first terminal is a sidelink transmitting terminal and the second terminal is a sidelink receiving terminal.

11. A method for vehicle-to-everything (V2X) communication performed by a second terminal in a wireless communication system, the method comprising:
- receiving, from a base station, a V2X system information block (V2X-SIB) including resource pool information associated with a first terminal, the resource pool information including a first parameter associated with a numerology for the first terminal and a second parameter associated with a numerology for the second terminal;
- identifying whether the first parameter is different from the second parameter based on the V2X-SIB;
- determining at least one parameter associated with a numerology of a sidelink signal to be received from the first terminal based on the first parameter, in case that the first parameter and the second parameter are different; and
- receiving, from the first terminal, the sidelink signal based on the determined at least one parameter.

12. The method of claim 11, wherein the at least one parameter is determined further based on information included in a field associated with another base station included in the resource pool information of the V2X-SIB.

13. The method of claim 11, wherein the sidelink signal comprises at least one of a sidelink synchronization signal block (S-SSB), a physical sidelink shared channel (PSSCH), a physical sidelink control channel (PSCCH), or a physical sidelink feedback channel (PSFCH).

14. The method of claim 11, wherein the at least one parameter comprises at least one of a subcarrier spacing (SCS), a cyclic prefix (CP) length, or a waveform for receiving the sidelink signal.

15. The method of claim 11, wherein the first terminal is a sidelink transmitting terminal and the second terminal is a sidelink receiving terminal.

16. A second terminal configured to perform vehicle-to-everything (V2X) communication in a wireless communication system, comprising:
a transceiver configured to transmit and receive a signal; and a controller configured to:
- receive, from a base station, a V2X system information block (V2X-SIB) including resource pool information associated with a first terminal, the resource pool information including a first parameter associated with a numerology for the first terminal and a second parameter associated with a numerology for the second terminal,
- identify whether the first parameter is different from the second parameter based on the V2X-SIB,
- determine at least one parameter associated with a numerology of a sidelink signal to be received from the first terminal based on the first parameter, in case that the first parameter and the second parameter are different, and
- receive, from the first terminal, the sidelink signal based on the determined at least one parameter.

17. The second terminal of claim 16, wherein the at least one parameter is determined further based on information included in a field associated with another base station included in the resource pool information of the V2X-SIB.

18. The second terminal of claim 16, wherein the sidelink signal comprises at least one of a sidelink synchronization signal block (S-SSB), a physical sidelink shared channel (PSSCH), a physical sidelink control channel (PSCCH), or a physical sidelink feedback channel (PSFCH).

19. The second terminal of claim 16, wherein the at least one parameter comprises at least one of a subcarrier spacing (SCS), a cyclic prefix (CP) length, or a waveform for receiving the sidelink signal.

20. The second terminal of claim 16, wherein the first terminal is a sidelink transmitting terminal and the second terminal is a sidelink receiving terminal.

* * * * *